(12) United States Patent
Ralston et al.

(10) Patent No.: US 8,196,979 B2
(45) Date of Patent: Jun. 12, 2012

(54) ENERGY ABSORBER WITH LOBES PROVIDING UNIFORM PEDESTRIAN IMPACT

(75) Inventors: Daniel Ralston, Walker, MI (US); Vidya Revankar, Grand Haven, MI (US); Amit Ashok Kulkarni, Grand Haven, MI (US); Darin Evans, Spring Lake, MI (US); Olaf Insel, Rothemühle (DE); Yassine Ghozzi, Wolfsburg (DE); Alexander Besch, Gifhorn (DE); Oliver Knoke, Braunschweig (DE); Ngoc-Dang Nguyen, Wolfsburg (DE)

(73) Assignees: Shape Corp., Grand Haven, MI (US); Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 12/940,680

(22) Filed: Nov. 5, 2010

(65) Prior Publication Data

US 2011/0109105 A1    May 12, 2011
US 2012/0061978 A9    Mar. 15, 2012

Related U.S. Application Data

(60) Provisional application No. 61/258,653, filed on Nov. 6, 2009.

(51) Int. Cl.
   *B60R 9/18* (2006.01)
(52) U.S. Cl. .................. 293/121; 296/187.04
(58) Field of Classification Search .......... 293/120–122; 296/187.04
   See application file for complete search history.

(56) References Cited

U.S. PATENT DOCUMENTS

| | | | |
|---|---|---|---|
| 3,933,387 | A | 1/1976 | Salloum et al. |
| 3,938,841 | A | 2/1976 | Glance et al. |
| 4,275,912 | A | 6/1981 | Bayer |
| 4,925,224 | A | 5/1990 | Smiszek |
| 4,941,701 | A | 7/1990 | Loren |
| 5,139,297 | A | 8/1992 | Carpenter et al. |
| 5,290,078 | A | 3/1994 | Bayer et al. |
| 5,290,079 | A | 3/1994 | Syamai |
| 5,425,561 | A | 6/1995 | Morgan |
| 5,988,713 | A | 11/1999 | Okamura et al. |
| 6,068,320 | A | 5/2000 | Miyano |
| 6,082,792 | A | 7/2000 | Evans et al. |
| 6,247,745 | B1 | 6/2001 | Carroll, III et al. |
| 6,315,339 | B1 | 11/2001 | Devilliers et al. |
| 6,398,275 | B1 | 6/2002 | Hartel et al. |
| 6,406,081 | B1 | 6/2002 | Mahfet et al. |
| 6,443,513 | B1 | 9/2002 | Glance |
| 6,467,821 | B2 | 10/2002 | Hirota |

(Continued)

FOREIGN PATENT DOCUMENTS

KR    10-0870413    11/2008

(Continued)

*Primary Examiner* — Dennis Pedder
(74) *Attorney, Agent, or Firm* — Price Heneveld LLP

(57) ABSTRACT

A bumper system includes an injection molded energy absorber of polymeric material having hollow longitudinally-spaced lobes configured to crush and absorb energy during a pedestrian impact, and straps interconnecting adjacent lobes. The lobes are particularly sized and dimensioned, including potentially external ribs and/or apertures in corners, to provide a relatively uniform impact energy absorption during an impact stroke during crush of the shear walls of the lobes, such as within +/−30% or more preferably within +/−20% of a desired amount regardless of a specific location of impact, along a selected center portion of the energy absorber. A reason for the uniformity is to promote pedestrian safety regardless of the specific location where a pedestrian's leg strikes the energy absorber.

38 Claims, 13 Drawing Sheets

U.S. PATENT DOCUMENTS

| | | | |
|---|---|---|---|
| 6,575,510 B2 | 6/2003 | Weissenborn | |
| 6,609,740 B2 | 8/2003 | Evans | |
| 6,644,701 B2 | 11/2003 | Weissenborn et al. | |
| 6,663,150 B1 | 12/2003 | Evans | |
| 6,669,251 B2 | 12/2003 | Trappe | |
| 6,669,252 B2 | 12/2003 | Roussel et al. | |
| 6,672,635 B2 | 1/2004 | Weissenborn et al. | |
| 6,685,243 B1 | 2/2004 | Evans | |
| 6,715,592 B2 | 4/2004 | Suzuki et al. | |
| 6,726,262 B2 | 4/2004 | Marijnissen et al. | |
| 6,746,061 B1 | 6/2004 | Evans | |
| 6,758,506 B2 | 7/2004 | Malteste et al. | |
| 6,848,730 B2 | 2/2005 | Evans | |
| 6,866,313 B2 | 3/2005 | Mooijman et al. | |
| 6,874,832 B2 | 4/2005 | Evans et al. | |
| 6,877,785 B2 | 4/2005 | Evans et al. | |
| 6,890,009 B2 | 5/2005 | Murata et al. | |
| 6,908,127 B2 | 6/2005 | Evans | |
| 6,923,494 B2 | 8/2005 | Shuler et al. | |
| 6,938,936 B2 | 9/2005 | Mooijman et al. | |
| 6,949,209 B2 | 9/2005 | Zander et al. | |
| 6,962,379 B2 | 11/2005 | Minami et al. | |
| 6,994,384 B2 | 2/2006 | Shuler et al. | |
| 6,997,490 B2 | 2/2006 | Evans et al. | |
| 7,044,515 B2 | 5/2006 | Mooijman et al. | |
| 7,052,056 B2 | 5/2006 | Weissenborn et al. | |
| 7,073,831 B2 | 7/2006 | Evans | |
| 7,086,690 B2 | 8/2006 | Shuler et al. | |
| 7,131,674 B2 | 11/2006 | Evans et al. | |
| 7,134,700 B2 | 11/2006 | Evans | |
| 7,144,054 B2 | 12/2006 | Evans | |
| 7,144,055 B2 | 12/2006 | Kimura et al. | |
| 7,147,258 B2 * | 12/2006 | Evans et al. | 293/120 |
| 7,159,911 B2 | 1/2007 | Nguyen et al. | |
| 7,163,242 B2 | 1/2007 | Shuler et al. | |
| 7,163,243 B2 | 1/2007 | Evans | |
| 7,172,227 B2 | 2/2007 | Weissenborn et al. | |
| 7,188,876 B2 | 3/2007 | Jaarda et al. | |
| 7,204,545 B2 | 4/2007 | Roux et al. | |
| 7,220,374 B2 | 5/2007 | Zander et al. | |
| 7,222,896 B2 | 5/2007 | Evans | |
| 7,222,897 B2 | 5/2007 | Evans et al. | |
| 7,234,741 B1 | 6/2007 | Reynolds et al. | |
| 7,278,667 B2 | 10/2007 | Mohapatra et al. | |
| 7,296,833 B2 | 11/2007 | Mohapatra et al. | |
| 7,399,014 B2 | 7/2008 | Mellis et al. | |
| 7,494,165 B2 | 2/2009 | Evans et al. | |
| 7,699,367 B2 * | 4/2010 | Evans et al. | 293/120 |
| 2002/0060462 A1 | 5/2002 | Glance | |
| 2002/0070584 A1 | 6/2002 | Carroll, III et al. | |
| 2003/0227183 A1 | 12/2003 | Weissenborn et al. | |
| 2004/0036302 A1 | 2/2004 | Shuler et al. | |
| 2004/0066048 A1 | 4/2004 | Mooijman et al. | |
| 2004/0174025 A1 | 9/2004 | Converse et al. | |
| 2004/0201255 A1 | 10/2004 | Jonsson | |
| 2004/0256867 A1 | 12/2004 | Evans et al. | |
| 2005/0269837 A1 | 12/2005 | Carroll, III et al. | |
| 2006/0001277 A1 | 1/2006 | Mellis et al. | |
| 2006/0018089 A1 | 1/2006 | Chou | |
| 2006/0043743 A1 | 3/2006 | Shuler et al. | |
| 2006/0261611 A1 | 11/2006 | Mohapatra et al. | |
| 2007/0069535 A1 | 3/2007 | Mohapatra et al. | |
| 2007/0210615 A1 | 9/2007 | Tamada | |
| 2009/0206618 A1 | 8/2009 | Ralston et al. | |
| 2010/0109354 A1 * | 5/2010 | Agrahari et al. | 293/120 |

FOREIGN PATENT DOCUMENTS

| | | |
|---|---|---|
| WO | 2004-018261 | 3/2004 |
| WO | 2006-127242 | 11/2006 |

* cited by examiner

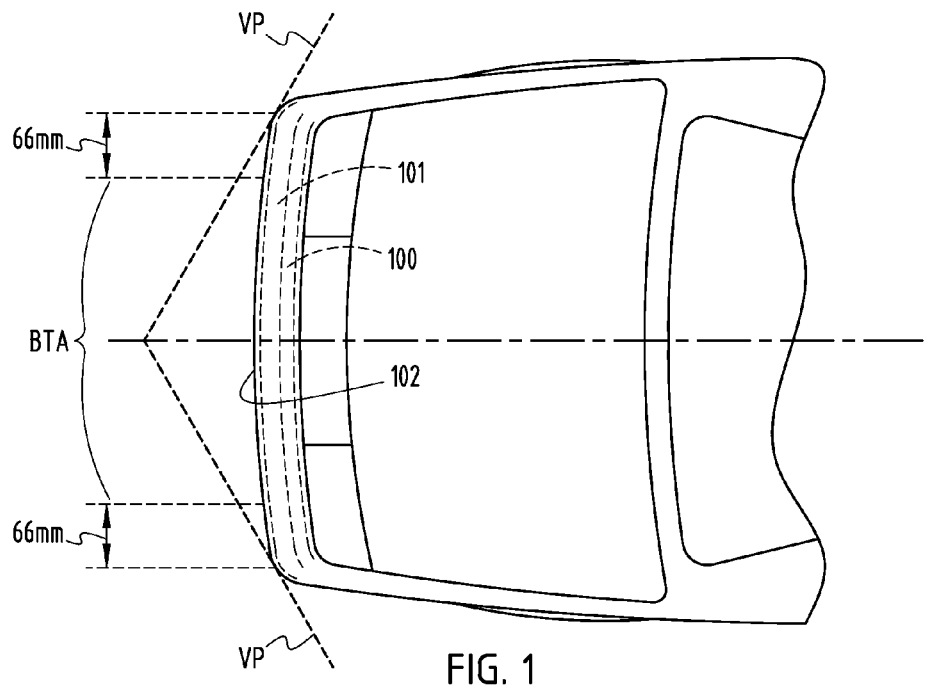
FIG. 1
PRIOR ART
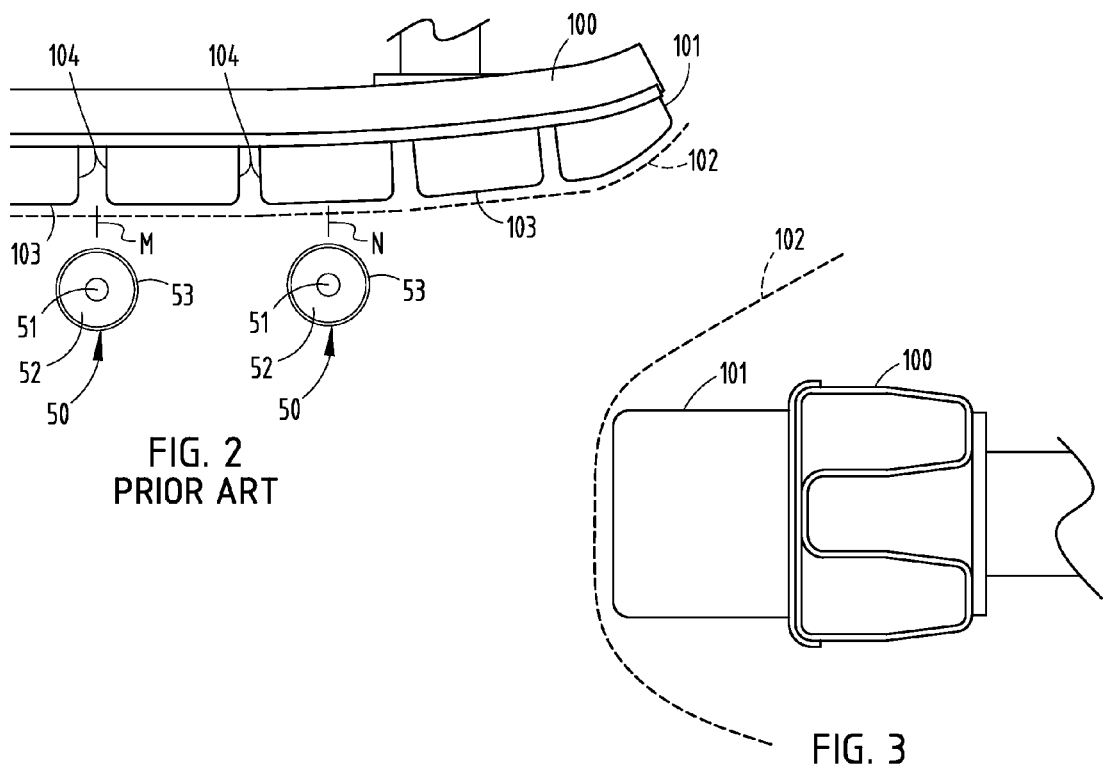
FIG. 2
PRIOR ART
FIG. 3
PRIOR ART

US 8,196,979 B2

ENERGY ABSORBER WITH LOBES PROVIDING UNIFORM PEDESTRIAN IMPACT

This application claims benefit under 35 U.S.C. Section 119(e) of provisional application Ser. No. 61/258,653, filed Nov. 6, 2009, entitled ENERGY ABSORBER WITH LOBES REDUCING PEDESTRIAN INJURY, the entire contents of which are incorporated herein in their entirety.

BACKGROUND

The present invention relates to vehicle bumper systems having energy absorbers, where the energy absorbers have hollow crush lobes constructed to collapse upon impact at predetermined rates of resistance and energy absorption.

Modern vehicle bumpers often include polymeric energy absorbers positioned on a face of a metal reinforcement beam and that are adapted to absorb impact energy. These energy absorbers often have forwardly-projecting hollow lobes (also called "crush boxes") that are elongated horizontally and where adjacent lobes are interconnected by straps. The lobes are often hollow "box shaped" structures that, when in a vehicle mounted position, include top and bottom horizontal shear walls, right and left vertical shear walls, and a front wall. However, this concept of spaced-apart elongated box-shaped lobes leads to inconsistent energy absorption across a length of the bumper system and thus varied performance depending on where a pedestrian's leg strikes the energy absorber.

For example, if a pedestrian's leg contacts the energy absorber between lobes during an impact, it will likely encounter two vertical shear walls (i.e. the two shear walls on either side of a particular strap, see the left leg impactor in prior art in FIG. 2), which generates a relatively higher force of impact against the leg. Also, if the leg contacts the energy absorber at a center of a lobe, the leg basically misses any vertical shear wall (see the right leg impactor in prior art in FIG. 2), and hence the rate of energy absorption during impact will be substantially lower. Notably, it is not at all clear what spacing or position or shape of the shear walls (i.e. walls that crush and absorb energy during an impact) on an energy absorber will give a best result, especially given the different densities and materials (i.e. bone, flesh, skin) within a pedestrian's leg and the roundness of a leg.

Notably, the impact against a pedestrian's leg is complex and difficult to replicate, such that various government and insurance companies have developed a standardized pedestrian leg impacting device (also called "standardized leg impactor") for use when conducting pedestrian impact testing. Specifically, a committee of the United Nations called UNECE has propagated a standard using a pedestrian-leg-simulating impactor 50 (see FIG. 2). The impactor 50 has a center core 51 that is a 70 mm diameter steel rod (which represents "bone"), surrounded by a 25 mm thick foam layer 52 (which represents "flesh"), and that is then wrapped in a 6 mm thick neoprene sleeve 53 (which represents "skin"), producing a total diameter of 132 mm. Since different densities are included through its interior, it is not at all clear what size or shape of lobe, nor spacing of shear walls or lobes, should be optimally provided in energy absorbers for a most uniform "best" resistance profile.

For the above reasons, improvements in energy absorbers with hollow crush lobes are needed to provide both reliable and predictable pedestrian impact characteristics across a length of the energy absorber as well as to provide desired impact characteristics for more severe impacts.

SUMMARY OF THE INVENTION

In one aspect of the present invention, a bumper system is provided for a vehicle having a longitudinal direction, the bumper system having corners defined by vertical planes oriented at 60° to the longitudinal direction and engaging a front of the bumper system, the bumper system further having a "bumper test area" defined about 66 mm inboard of each of the corners but excluding a center region of 250 mm of the bumper system. The bumper system includes a bumper reinforcement beam configured for attachment to a vehicle frame, and an energy absorber positioned on a face of the beam. The energy absorber includes a plurality of spaced-apart hollow crush lobes in the bumper test area that are configured to crush and absorb energy during a pedestrian impact. The lobes are configured to provide a uniform impact energy absorption during crush of within +/−30% of a desired average impact energy absorption force-deflection profile for impact intrusions that crush the crush lobes at least 10 mm in longitudinal locations along a length of the "bumper test area". By this arrangement, the bumper system provides for pedestrian safety regardless of a specific location where a pedestrian's leg strikes the energy absorber.

In another aspect of the present invention, an energy absorber is configured to be positioned on a face of a structural member for absorbing energy during an impact against the structural member, the energy absorber including a base flange configured to engage a reinforcement beam and including a plurality of spaced-apart hollow lobes extending from a base flange. The energy absorber defines a test area including at least three adjacent hollow lobes but excluding end sections of the energy absorber and excluding a center region of about 250 mm. The lobes each have shear walls configured to crush and absorb energy when impacted, and the base flange includes straps interconnecting adjacent lobes. The lobes and straps in the test area are configured, sized and spaced to provide a uniform impact energy absorption during crush of within +/−30% of a desired average impact energy absorption force-deflection profile for impact intrusions of at least 10 mm in longitudinal locations along a length of the "test area" for pedestrian safety regardless of the specific location where an impactor strikes the energy absorber. The lobes in the test area have centerlines spaced longitudinally between 90 mm to 132 mm apart.

In another aspect of the present invention, an energy absorber is configured to be positioned on a face of a beam. The energy absorber comprises a base flange, and at least one hollow lobe extending from the base flange and having top and bottom shear walls and vertical shear walls that join to define four corners. There is at least one aperture strategically located at a base of each corner, the at least one aperture extending partially around each respective corner and into the associated adjacent walls to reduce columnar strength of the respective corner. The shear walls and apertures are shaped and sized to cause a predictable and uniform impact resistance to a pedestrian's leg regardless of a specific location where the pedestrian's leg strikes the energy absorber, the impact resistance being uniform to within +/−30% of a desired force deflection profile during impacts crushing more than 10 mm the at least one hollow lobe to absorb energy.

In another aspect of the present invention, an energy absorbing system for a vehicle includes a structural member configured for attachment to a vehicle; and an energy absorber positioned on a face of the structural member. The energy absorber has at least four hollow crush lobes defining a test area and when impacted defining a working portion of a force-deflection curve where the crush lobes collapse to absorb energy. The crush lobes are longitudinally spaced apart and configured to provide a uniform impact energy absorption during the working portion of the force-deflection curve of within +/−30% of a desired average impact energy absorption force-deflection profile in locations along a length of the test area.

In another aspect of the present invention, a method comprising steps of providing an energy absorber with a base flange configured to engage a support structure and including spaced-apart hollow lobes extending from the base flange and defining a test area; the lobes each including shear walls configured to crush and absorb energy along a force deflection profile when impacted by a pedestrian-leg-simulating impactor for an intrusion stroke causing collapse of the hollow lobes of at least 10 mm. The method further includes tuning the crush lobes of the energy absorber to improve uniformity of energy absorption to within +/−30% of a desired average energy absorption profile regardless of a specific location of impact by the impactor along the test area of the energy absorber by forming at least one of apertures and external ribs on the crush lobes, where the ribs, if present, are located on shear walls of the crush lobes and where the apertures, if present, are located at corners formed by adjacent ones of the shear walls, to thus provide uniform performance and pedestrian safety regardless of a specific location where a pedestrian's leg strikes the energy absorber.

These and other aspects, objects, and features of the present invention will be understood and appreciated by those skilled in the art studying the following specification, claims and appended drawings.

BRIEF DESCRIPTION OF THE DRAWINGS

FIGS. 1-3 show a prior art bumper system, FIG. 1 being a top view, FIG. 2 being a fragmentary top view minus fascia and also showing a pedestrian-leg-simulating impactor 50, and FIG. 3 being a cross sectional view.

FIG. 29 is a perspective view of a section of a modified energy absorber similar to FIG. 27 but with apertures at corners.

FIG. 30 is a perspective view of a section of a modified energy absorber similar to FIG. 29 (i.e. no corner apertures) and including exterior ribs to stabilize top and bottom side walls of the crush lobes.

DESCRIPTION OF PRIOR ART

Figure 4:
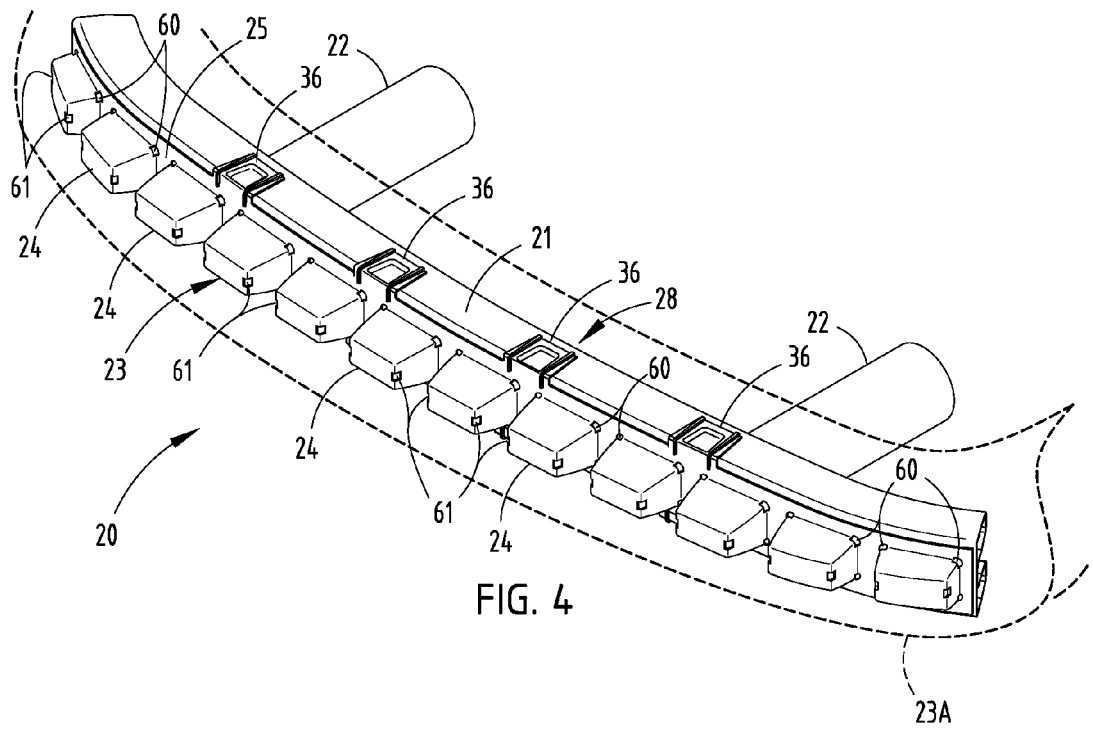
FIGS. 4-9 are perspective, enlarged fragmentary perspective, top, front, rear perspective and bottom views of a bumper system embodying the present invention, FIGS. 4 and 6 showing the reinforcement beam and energy absorber, and FIGS. 4-9 showing the energy absorber constructed to provide uniform pedestrian impact resistance across its pedestrian impact area.

FIGS. 1-3 illustrate one type of prior art bumper system including a bumper reinforcement beam 100 (see FIGS. 2-3) and a polymeric energy absorber 101 on its face surface, covered by an aesthetically colored fascia 102 (e.g. RRIM, injection molded TPO or other material). The energy absorber 101 abuts the face surface and includes energy-absorbing crush lobes 103 with walls configured to crush and absorb energy upon impact. The walls include vertical shear walls 104. The illustrated lobes 103 are elongated parallel a length of the beam, and have a length significantly longer than that of a pedestrian's leg (illustrated by a standard leg impactor 50), such that their impact resistance varies widely depending on a location of impact. When a pedestrian's legs (illustrated by impactor 50) is impacted at location M (FIG. 2) (i.e. where the impact is centered between adjacent lobes), the leg receives a relatively higher impact resistance from two vertical shear walls 104. However, when impacted at location N (i.e. the impact is centered on a single lobe), the leg receives a relatively lower impact resistance (i.e. virtually no impact resistance from any vertical shear wall). This is because the lobe is elongated, such that there is no close vertical shear wall to location N. This condition results in inconsistent and unpredictable impact energy absorption when a pedestrian is impacted.

One organization that evaluates pedestrian impact is the UNECE, a committee in the United Nations (UN), which has released Global Technical Regulation (GTR) No. 9. This is in the process of being adopted by member nations and once adopted in each individual country, this will be a regulation. The pedestrian impact criteria primarily apply to a front section of a bumper system located between corners of the vehicle, because that is where pedestrian impacts are often struck and cause greatest injury.

In UNECE's Global Technical Regulation No. 9, a "corner of a bumper" is established by the vehicle's point of contact with a vertical plane which makes an angle of 60 degrees with the vertical longitudinal plane of the vehicle and is tangential to the outer surface of the bumper. (See FIGS. 1 and 6.) A "bumper test area" BTA (also called herein "pedestrian-impact bumper test area" as used for assessing pedestrian impact) is then established in a zone between locations 66 mm inboard of the "corners." Specifically, the "bumper test area" means the frontal surface of the bumper limited by two longitudinal vertical planes VP intersecting the corners of the bumper and moved 66 mm parallel and inboard of the corners of the bumper.

The standardized test fixture (impactor 50) (see FIGS. 2 and 14) (also called a "pedestrian leg impactor") is used in bumper impact testing under Regulation No. 9 to simulate impacts against a "typical" pedestrian's leg. It includes an internal steel rod 51 (i.e. "bone") of 70 mm diameter, a cylinder of foam 52 (i.e. "flesh") forming a tube of 25 mm thickness around the rod 51 to thus form an outer diameter of 120 mm, and a sleeve 53 (i.e. "skin") forming a tube of 6 mm thickness around the foam 52 to thus form an outer diameter of about 132 mm.

Figure 16:
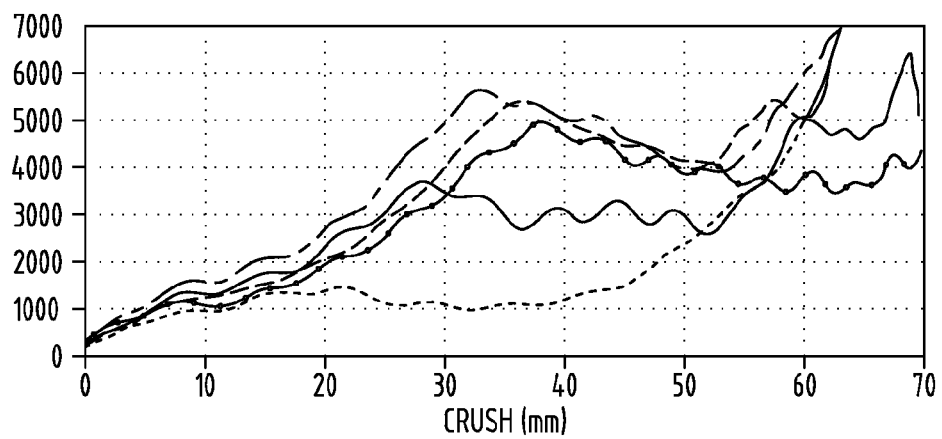
FIGS. 16-17 are graphs showing force versus displacement curves for two prior art bumper systems, each having a prior art energy absorber on a prior art reinforcement beam, FIG. 16 being an injection molded energy absorber and FIG. 17 including a metal energy absorber.
Figure 17:
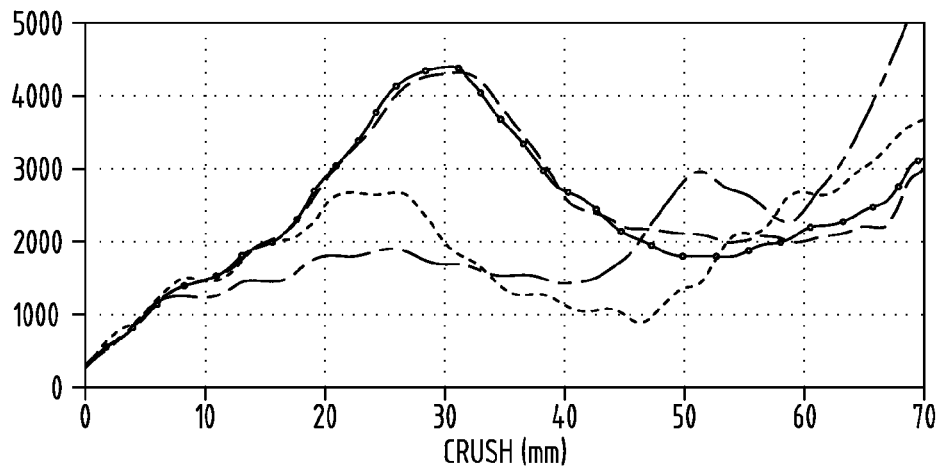

FIGS. 16-17 illustrate force versus deflection curves for two prior art bumper systems with prior art energy absorbers tested to define a benchmark for uniformity of their resistive forces across their length in the "bumper test area" defined above, one being polymeric material and the other being made of metal. As shown, the resistive forces varied by as much as about 150% to 400% at a crush/intrusion of about 30 mm, depending on where the impact occurred along the bumper system. For example, in the prior art bumper system with energy absorber tested in FIG. 16, at 30 mm intrusion, the resistive force (depending on where struck) was as little as about 1000 N or as high as about 5000 N. Further in FIG. 16, noticeable significant differences in the amount of resistive forces become apparent as low as 10 mm intrusion, and dramatic differences were noted above 30 mm to 60 mm intrusion. In the prior art bumper system with energy absorber tested in FIG. 17, at 30 mm intrusion, the resistive force was as little as about 1700 N or up to about 4300 N. Again, the amount of resistive forces starts to be significant and different as low as 10 mm intrusion or lower, and significant at intrusions above 30 mm to 60 mm.

DETAILED DESCRIPTION OF PREFERRED EMBODIMENT

In the present description, various terms are used to facilitate a description, such as height, width, length, upper, lower, right, left, and etc. These terms are used to facilitate the description, but are not intended to be unnecessarily limiting. Further, it is noted that sometimes the terms refer to the part in a vehicle-mounted orientation (where the lobes face horizontally/forwardly), while other times the terms are used to refer to the energy absorber laying on a rest surface such as a table (with the lobes facing upwardly).

A vehicle bumper system 20 (FIGS. 4-6) includes a reinforcement beam 21 mounted to a vehicle frame by mounts 22, and an energy absorber 23 on its face, covered by a fascia (see the fascia 23A in FIG. 2). The illustrated energy absorber 23 (FIGS. 6-10) is injection molded of polymeric material and includes hollow longitudinally-spaced energy-absorbing lobes 24 (also called "crush boxes") and co-planar straps 25 (coplanar with and forming part of base flange 27) interconnecting the lobes 24 that abut the face. We have found that if the energy absorber 23 includes energy-absorbing crush lobes 24 having a lobe longitudinal spacing (dimension DLS) set between a centerline spacing of about 90 mm to about 132 mm (and more preferably 100 mm to 120 mm, and most preferably about 110 mm), and strap widths (measured in a longitudinal direction of the bumper beam) of between about 15 mm and 50 mm (and more preferably about 20 mm to 45 mm, or most preferably between 30 mm to 40 mm), that the performance is significantly more consistent, independent of an impact location.

For example, an energy absorber (such as energy absorber 23 with lobes 24) made using the present innovation can be constructed to provide a uniform impact force of resistance in a range of within +/−30% (or more preferably within a range of 25%, and most preferably within a range of 20% to as low as 10% variation) of a desired average impact energy-absorption profile across its bumper impact area for an impact stroke of greater than 10 mm up to 40 mm or more. One optimal energy absorber range would be where a spacing between lobe centers is a dimension A, and where a depth of a given lobe is a dimension B, and where a ratio of A:B is equal to about 110:65 within a range of +/−20%.

It is noted that, in the present innovation, the entire bumper test area may have a uniform impact energy-absorption profile. However, it is also contemplated that many times the energy absorber will not have uniformity across a center region of the bumper test area, and therefore a scope of the present invention is contemplated to include this possibility. Specifically, the absence of uniformity in a center region of an energy absorber in a bumper system may be due to a variety of different reasons. For example, pedestrians are not usually struck by a center of the bumper test area due to their effort to get out of the way of the vehicle immediately prior to impact. Further, a license plate attached to the center region of the bumper system may change the impact result, such that a requirement of uniformity is nonsensical. Also, other structural features may be located at a center of the bumper system that may make a requirement of uniformity in the center region nonsensical. Thus, the requirement of uniformity of impact energy absorption profile may exclude a center region of an energy absorber in the present innovative bumper system for a distance of about 250 mm, or more preferably for a distance of about 200 mm.

Our testing shows us that a depth of the crush lobes 24 (measured from the base flange at the bumper beam's face surface to a tip of the crush lobe when in a vehicle-mounted position) can be varied as required by package space on the vehicle and as allowed by the OEM vehicle manufacturer for impact stroke. For example, a depth of the crush lobes can be about 50-90 mm, or more preferably about 55 mm-80 mm. The present innovation allows the uniformity to be extended to different crush strokes, as shown in FIGS. 16-24 and discussed below.

Our testing shows us that a vertical height of the crush lobes (24) (i.e. a vertical dimension when the energy absorber is in a vehicle-mounted position) is not as important as lobe spacing and lobe width. However, generally stated, a preferred lobe height (measured in a fore-aft direction when in a vehicle-mounted position and measured at a middle point on the exterior surface of the shear walls) is about 50 mm to 90 mm, and more preferably about 60 mm-80 mm.

Our testing shows that a wall thickness of shear walls and front (face) wall in lobes 24 affects a strength and uniformity of impact resistance. Preferably, the energy absorber 23 is made of injection molded polypropylene or TPO material, and made to include a top and bottom (horizontal) shear wall (45,46) having a wall thickness of about 1.5 mm-2.8 mm (or more preferably a wall thickness of about 1.75 mm-2.4 mm), and to include vertical shear walls (47,48) having a wall thickness of about 1.5 mm-2.8 mm (or more preferably a wall thickness of about 1.75 mm-20 mm), and to include a front (face) wall (49) having a wall thickness of about 1.5 mm-2.8 mm (or more preferably a wall thickness of about 1.75 mm-2.0 mm). It is noted that the shear walls (47,48) (top, bottom and sides) may vary in wall thickness due to a draft angle that facilitates molding. Notably, the illustrated shear walls (45-48) have a slight crown or curvature (in a fore-aft direction when mounted to a vehicle), such as 200 mm to 350 mm radius (also called a "crown"). However, it is contemplated that the shear walls can have an infinite radius crown (i.e. a flat wall), or can have another non-linear shape. As used herein, a "crown" in a vertical shear wall means a radius about a vertical axis spaced a radial distance from the shear wall and on the concave side of the wall. A "crown" in a horizontal shear wall means a radius about a horizontal axis spaced a radial distance from the shear wall and on the concave side of the wall.

The corners formed by lobe walls (45-49) can adversely affect localized energy absorption during lobe crush due to their columnar strength, thus causing spikes in loading at impact locations aligned with one of the vertical shear walls 47 or 48. Concurrently, a shape of corners also affects uniformity of energy absorption across the energy absorber in the bumper impact area. The illustrated lobes 24 are radiused along all corners to facilitate injection molding, as evidenced by the curved corners found at the juncture along/between any two of the walls 45-49 and base flange 27 and straps 25. A cross section transversely through the preferred shape of corners typically defines a radius of about 2 mm-8 mm, or more preferably a radius of about 3 mm-6 mm radius, or most preferably a radius of about 3 mm-5 mm. Nonetheless, it is noted that the present invention can be used on lobe structures/corners having narrower or greater radii or curvilinear shapes, or corners with other shapes. It is noted that in the data referring to a width of straps (e.g. for example "20 mm width"), the strap width includes the flat portion (i.e. for example about 15 mm) of the strap and also includes about half of the radiused corner on each side (i.e. about an additional 3 mm on each side, based on the procedure that we used to measure same). A remainder of the corner radius becomes part of the side wall (45-48) for purposes of the present discussion, although it is noted that the discussion herein primarily refers to centerline spacing of the lobes, and usually does not refer to spacing of vertical shear walls on a given lobe nor between lobes 24.

A uniformity of the frontal impact can be improved by reducing "columnar" stiffness in specific areas where the impact force is undesirably high above the desired average impact strength, including providing a weakening structure (sometimes called a "crush initiator"), such as an aperture 60 (FIG. 5) or opening at a bottom of the corners of each lobe 24 or at junctures of walls, or at an apertures 61 at a top of the vertical shear walls 47-48, as described below. In other words, apertures 60,61 act to reduce columnar and wall stiffness at locations having an undesirably high stiffness, and that otherwise would cause a location-specific load spike. For example, the aperture 60 is included at the bottom of each of the four corners defined by four shear walls 45-48 and the beam-abutting strap 25/base flange 27. Also, apertures 61 (FIG. 5) may be advantageously included at the outer edges of the front face wall 49 at a center location on each of the vertical shear walls 47,48. It is contemplated that the apertures 60 and 61 can be any size or shape, but our testing shows that rectangular apertures work well, with the aperture extending across the corner and into the two or three adjacent walls forming the corner.

Often a uniformity of the frontal impact can be improved by increasing stiffness of the lobes 24 in specific areas where the impact force is undesirably low compared to the desired average impact strength. For example, this can be done by providing external ribs 62 on the top and bottom shear walls 47, 48 (FIG. 30), thus stiffening the top and bottom shear walls 47,48, as discussed below in regard to energy absorber 23D (FIG. 30).

The illustrated energy absorber 23 (FIGS. 6-10) includes a base flange 27 from which the lobes 24 extend forwardly, and further include rearwardly-extending top and bottom attachment flanges 28 spaced along top and bottom edges of the base flange 27. In some energy absorbers 23, testing suggests it would be beneficial to include an aperture 60 at each of the four corners of the lobes adjacent the base flange 27 (and extending onto the base flange 27/strap 25). The lobes 24 are box-shaped with relatively flat walls except at corners. Each lobe 24 includes top and bottom walls 45, 46, and also vertical shear walls 47, 48 (which form ends of the "box" in a longitudinal direction) and also include a front wall 49 "closing" a front side of the box shape. The walls 45-48 are slightly crowned or curved for providing a softer impact (i.e. less of a load spike prior to beginning to crush and collapse).

Some corners referred to extend top to bottom of the lobes and are formed by material connecting adjacent walls 45-49 of the lobes and the straps 25/base flange 27. These corners form radiused structures extending at about a "90 degree" angle to a bumper beam face (in an expected direction of impact), but include draft angles to facilitate molding. The corners can provide significant localized impact stiffness, adding to the inconsistency of impact resistance against a pedestrian's leg along a length of the energy absorber. By weakening these corners, such as by providing apertures 60, 61 the high load spike that would occur from an impact centered over a vertical shear wall is reduced to be more consistent with other locations along the energy absorber. The illustrated corners formed by joindure of any of the walls 45-49 and straps 25 and base flange 27 are typically about 2 mm-8 mm radius, or more preferably about 3 mm-6 mm radius, and most preferably about 3 mm-5 mm, although the present invention can be used on narrower or greater radiused lobe wall structures.

It is contemplated that the energy absorber 23 can be attached to the reinforcement beam 21 by different means. The illustrated energy absorber 23 includes top and bottom attachment flanges 28 spaced along a length of the energy absorber. The illustrated bottom attachment flanges 28 include sets of three adjacent bottom flanges 33-35 (FIG. 8), and the top attachment flanges 28 include a single extra-wide opposing top flange 36. The center bottom flange 34 and top flange 36 can include a tooth 37 or pad 40, respectively, for frictionally engaging a mating feature (or hole) in the top and bottom walls of the mating reinforcement beam 21. The flanges 33-36 may also include exterior stiffener ribs 38,41 for added strength. The flanges 33-36 may include a friction generating pad (instead of a tooth) for temporary retention to the reinforcement beam (e.g. until a fascia is attached). The illustrated top flange 36 includes an enlarged raised pad 40 and also outside stiffener ribs 41. The tooth 37 and pad 40 are configured with inclined lead-in surfaces that define a ramped throat to facilitate attaching the energy absorber onto a bumper reinforcement beam 21. It is contemplated that the energy absorber 23 could also (or instead) be configured for attachment to a RIM fascia that covers the bumper system.

Figure 6:
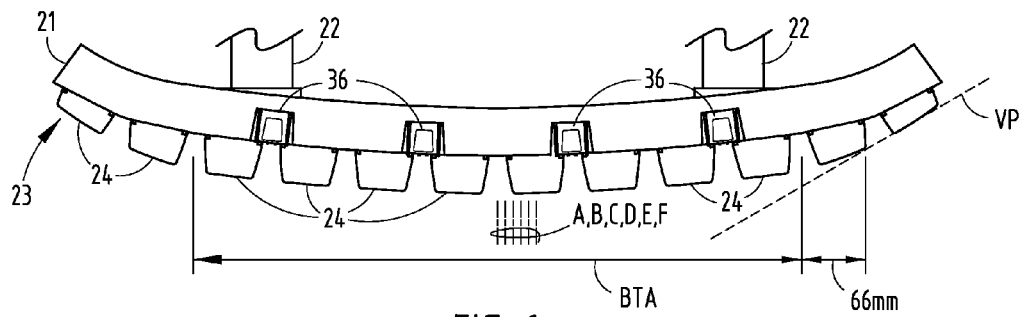
Figure 7:
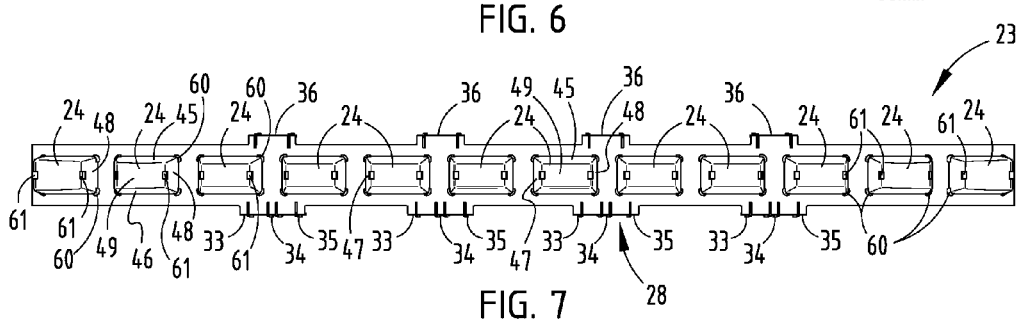
Figure 8:
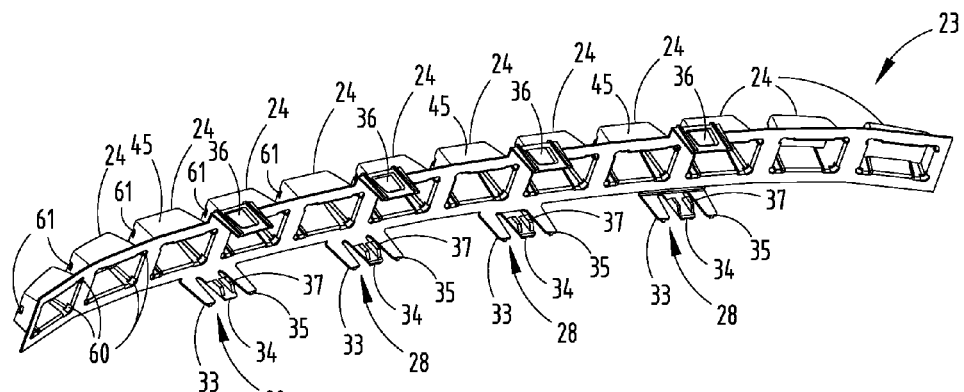
Figure 9:
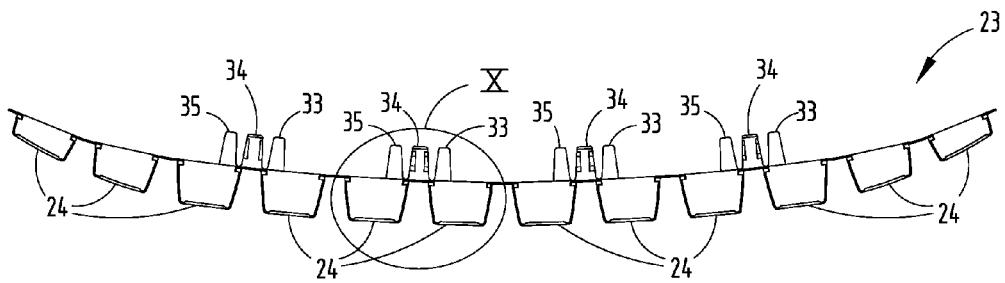

It is noted that FIGS. 2 and 6 illustrate the prior art standardized test fixture 50 that simulates (i.e. "represents") a pedestrian's leg (also called the "pedestrian's leg" or "pedestrian leg impactor" herein). The leg 50 includes a steel rod 51 (i.e. "bone"), foam 52 (i.e. "flesh"), and sleeve 53 (i.e. "skin"), as noted above.

Figure 14:
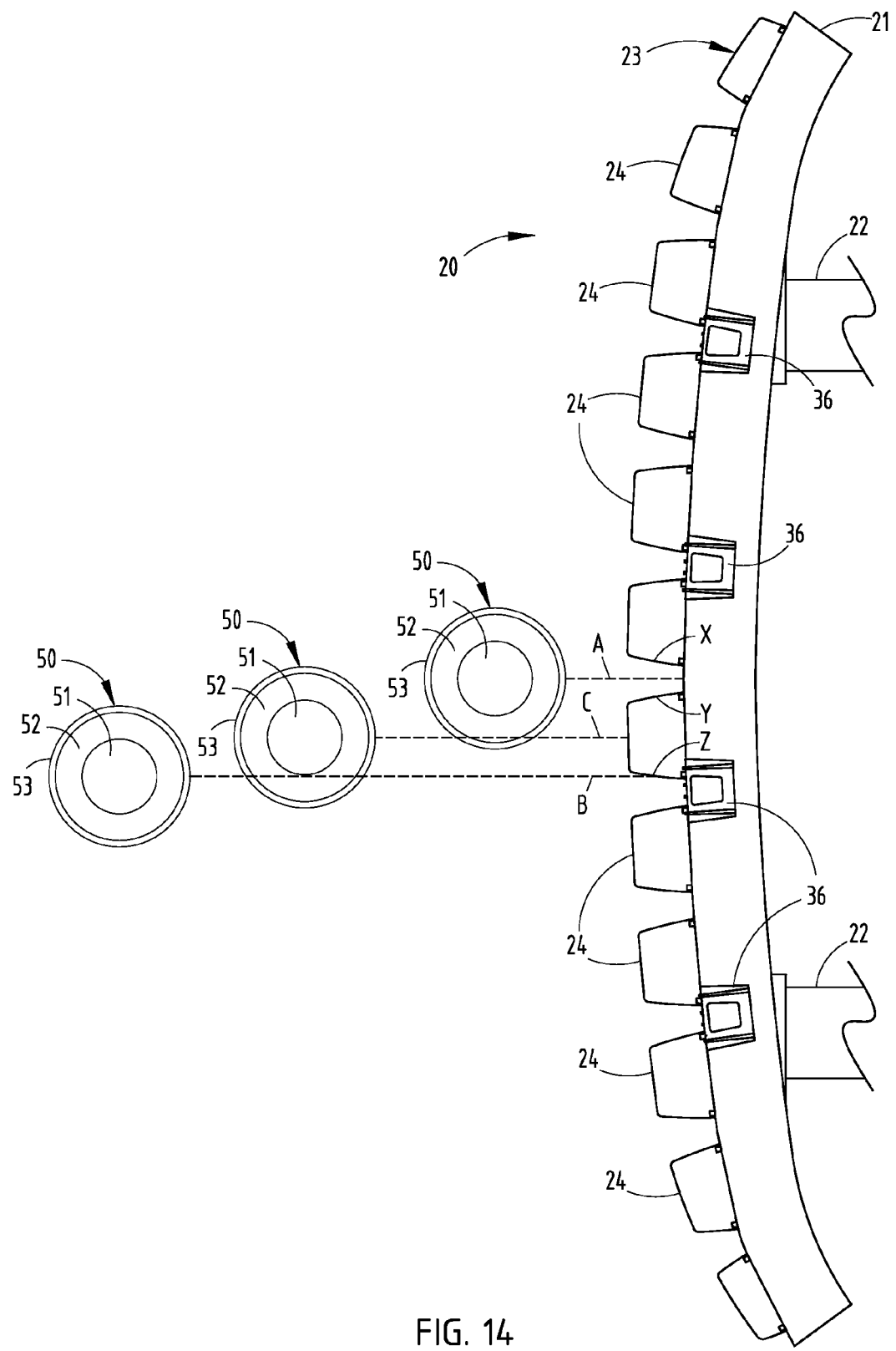
FIG. 14 is a top view similar to FIG. 6 but showing the energy absorber attached to a beam and being struck in three different locations by a pedestrian-leg-simulating test impactor.

As shown in FIG. 14, the leg 50 may impact the energy absorber 23 at different locations, illustrated as locations A, B, or C in the figure, each being located in the pedestrian-impacting bumper test area. At impact location A, the vertical shear walls X and Y are engaged evenly, and at location C, the vertical shear walls Y and Z are engaged evenly. As a center of the impact location shifts from a center-of-lobe impact location "A" to an edge-of-lobe impact location "C," there is a transition including one position (see impact location B) aligned directly with one of the vertical shear walls 47,48. It is noted that the preferred crush lobe 24 has a centerline spacing (dimension DLS) of 110 mm. This leads to a longitudinal spacing between vertical shear walls 47,48 in a given lobe in energy absorber 23 of about 65 mm-70 mm (keeping in mind that draft angles for molding must be accounted for, as well as radiused corners), while the longitudinal spacing between vertical shear walls 47,48 of adjacent lobes is about 40 mm-45 mm. Considering the standardized leg impactor 50 has an outer dimension of 132 mm, it is counter-intuitive that this spacing and lobe width would provide a relatively constant impact resistance across the entire pedestrian-impacting bumper test area. (See FIG. 6.) Thus, this is a surprising and unexpected result to us, providing unexpected and unanticipated benefits.

Figure 5:
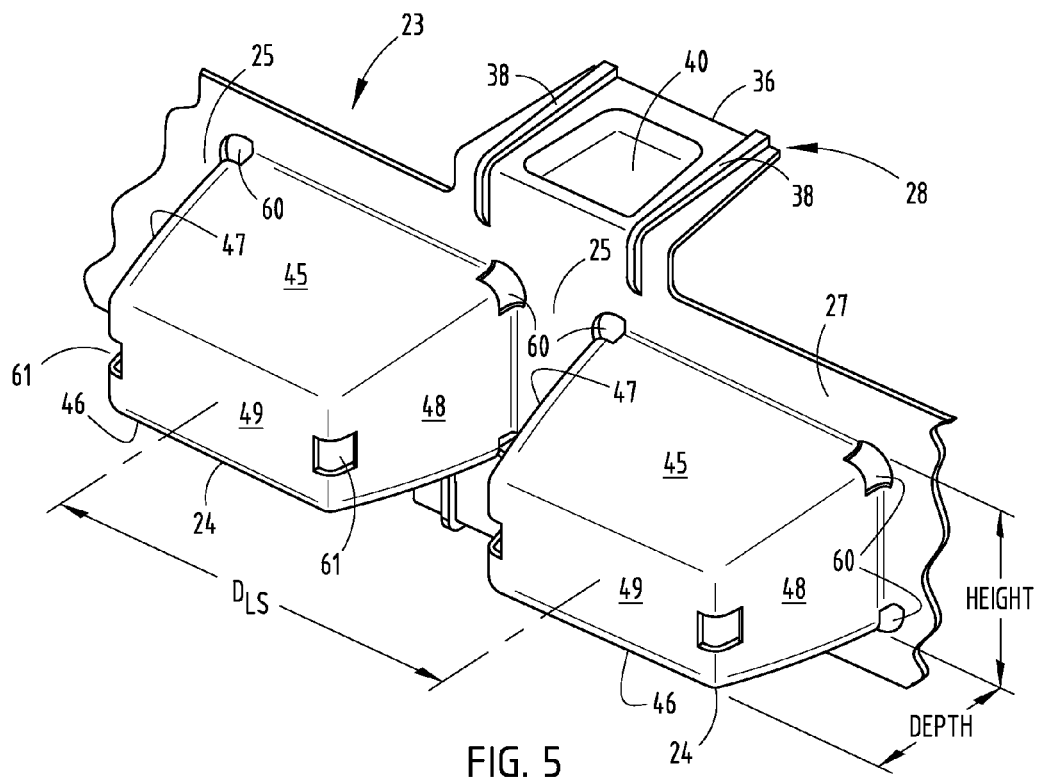
Figure 15:
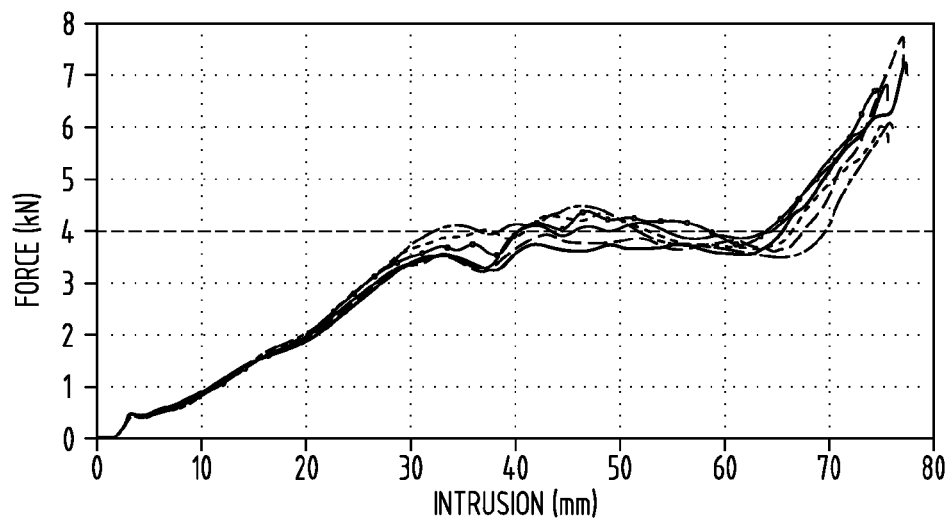
FIG. 15 is a graph showing force versus displacement curves for a bumper system embodying the present invention at six different locations spaced longitudinally 11 mm from each other, the bumper system being the system shown in FIGS. 4-14.

FIG. 15 shows a force deflection curve (also called a "force deflection profile") for a bumper system 20 like that shown in FIGS. 4 and 6, where the energy absorber 23 included identical lobes 24 across a pedestrian-impacting bumper test area "BTA", the lobes 24 being centerline spaced at 110 mm longitudinally and having straps of about 35 mm-40 mm width separating adjacent lobes. The vertical shear walls 47,48, and also the top and bottom shear walls 45,46, in the illustrated energy absorber 23 had a curvature of about 150 mm-300 mm radius. The lobes 24 had a depth of 65 mm, and a wall thickness of about 1.5 mm-2.5 mm, and included an aperture 60 at each corner of the lobe adjacent the base flange, and further included an aperture 61 centered on a tip of the vertical shear walls 47,48 extending onto the front wall 49. The lobes 24 did not include any ribs (66) nor undulations in the top and bottom shear walls 47,48.

Figure 10:
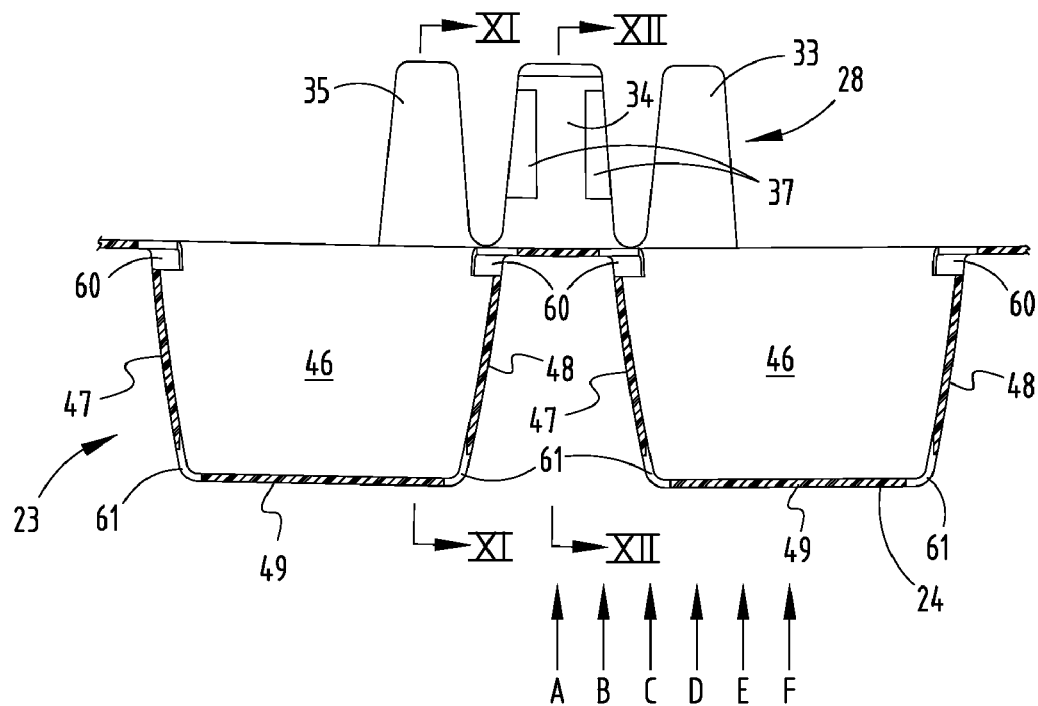
FIGS. 10-12 are cross sectional views, FIG. 10 being an enlarged cross section in the circled area X in FIG. 9, FIGS. 11-12 being cross sections taken along lines XI-XI and XII-XII in FIG. 10.
Figure 11:
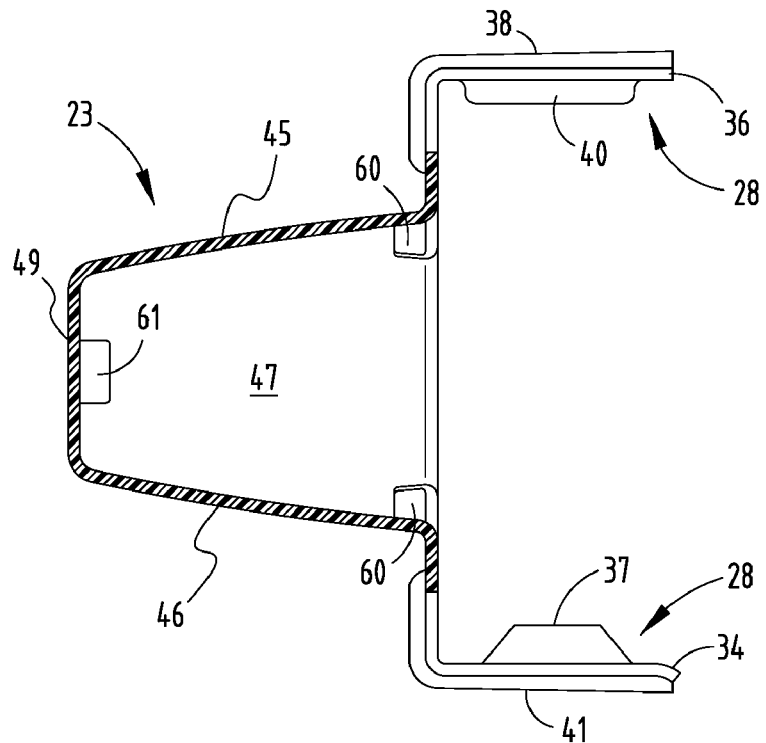
Figure 12:
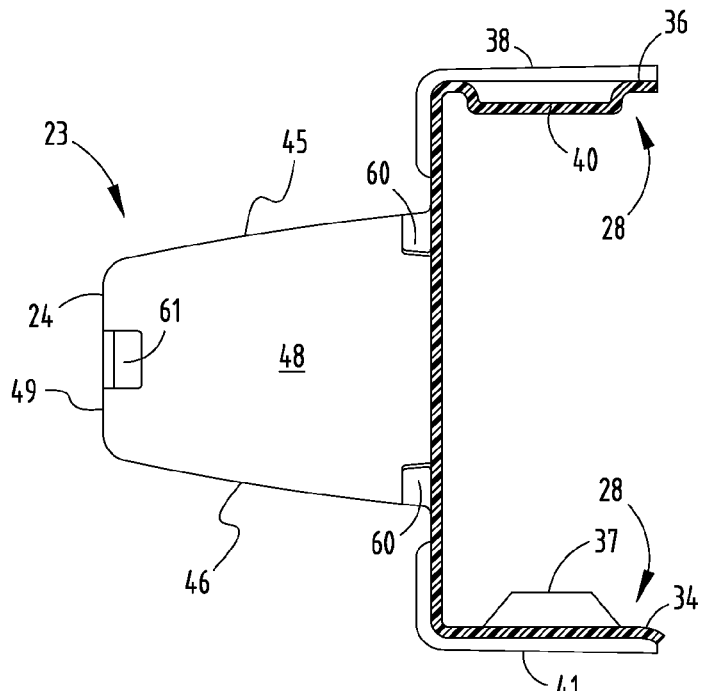
Figure 13:
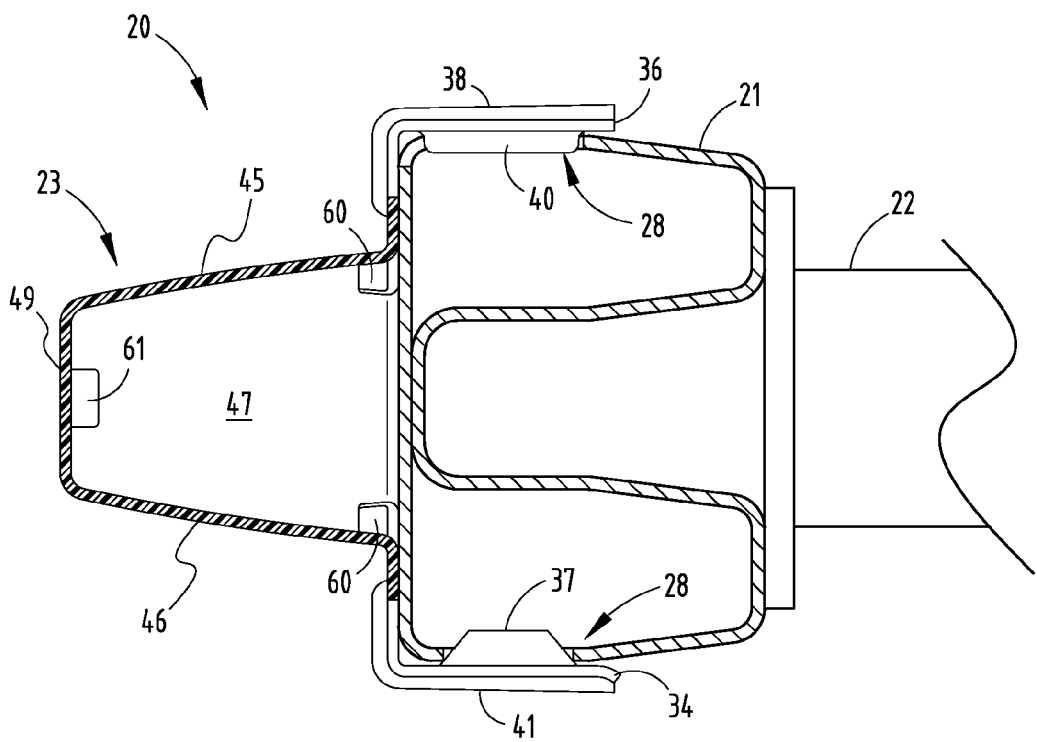
FIG. 13 is an enlarged cross section similar to FIG. 11 but showing the energy absorber attached to the beam like I shown in FIG. 4.

FIG. 15 is data from a test conducted at six impact locations, each being located 11 mm apart from the previous impact location. As shown in FIGS. 6 and 10, the first impact location A was directed between the lobes in a center location (over a strap). The next impact location B was directed 11 mm to one side, the next impact location C was directed 11 mm still further toward one side, and similarly for impact locations D, E, and F. The impact location F was directed into a center of a lobe 24. Since all lobes 24 are symmetrical and identical in size and shape, the impact locations A-F represent the impact resistance for all locations across the bumper test area, since the underlying structure of each lobe and its relation to the impactor 50 is repeated as one continues across a length of the energy absorber 23 in the bumper test area dimension BTA. As shown in the graph of FIG. 13, the force of resistance for all six locations A-F is virtually identical up to 25 mm intrusion, and is similar to within about +/−5% impact resistance at 30 mm intrusion, and is still similar to within about +/−10% impact resistance at about 60 mm intrusion. (Compare FIG. 15 which represents the test results on an energy absorber of the present invention, to FIGS. 16-17 which represent two known/prior art parts used as benchmarks, one being plastic, one being metal.)

During an impact against a pedestrian's leg, a force deflection curve (also called a "force-deflection profile" or "impact-force-versus-intrusion profile") results where the force of resistance to the impact increases from zero, and then levels off, and then again dramatically increases. Specifically, a first portion of the force-deflection curve of an impact is greatly influenced by deformation, flexure and compressing of the pedestrian leg's flesh and skin (herein called "initial impact and compression portion" of the force-deflection curve). This is followed by a second portion (herein called the "working portion" of the force-deflection curve during an impact crush stroke) where the energy absorber is doing its work by the shear walls of crush lobes crushing to absorb energy. (During this phase, the shear walls "crinkle" and form multiple irregular bends and folds, causing significant energy absorption via material deformation). This is followed by a third portion (herein called the "stacked flat portion" of the force-deflection curve, or in other words the "reinforcement beam resistance portion") where the energy absorber has basically crushed flat and thus the force of resistance is primarily that of the underlying support structure (which in the case of a bumper system is a reinforcement beam that is usually metal and is very stiff). For example, in FIG. 15, the first portion (i.e. "initial impact and compression portion" in the force deflection curve) is from zero intrusion to about 30 mm intrusion; the second portion (i.e. the "working portion") is from 30 mm to about 63 mm intrusion (with the force of resistance staying relatively constant within a small range of variability), and the third portion (i.e. the "beam resistance portion") is above 63 mm intrusion (where the force of resistance increases dramatically). Contrastingly, in FIG. 18, the first portion (i.e. "initial impact and compression portion") is from zero to about 25 mm intrusion; the second portion (i.e. the "working portion") is from 25 mm to about 60 mm intrusion), and the third portion (i.e. the "beam resistance portion") is above 60 mm intrusion. Contrastingly, in FIG. 21, the first portion (i.e. "initial impact and compression portion") is from zero to about 25 mm intrusion; the second portion (i.e. the "working portion") is from 25 mm to about 70 mm intrusion), and the third portion (i.e. the "beam resistance portion") is above 70 mm intrusion.

We conducted several studies to determine a sensitivity of energy absorber lobe dimensions and optimal ranges. Our studies suggest that good ranges for a particular bumper system ("vehicle application") as follows. It is noted that in our opinion, the present dimensions are significant, unobvious, and provide surprising and unexpected results since, for example, a 110 mm spacing between lobe centerlines is unexpectedly different than any dimension of the impactor 50 and unexpectedly different than any dimension of a typical human leg.

Lobe Width Spacing 90 mm to 132 mm (more preferably 100 mm-120 mm, optimal 110 mm)
Lobe Height 60 mm+/−20% or more preferably +/−10%
Depth 50 mm to 80 mm (influenced significantly by styling)
Wall Crown planar to crowned, or more preferably 150 mm and 300 mm
Thickness 1.5 mm to 2.25 mm+/−10%
Corrugations/stiffening-ribs along walls (as needed)
Radii/Holes along Corners and at Joints (vary as needed)
Strap widths 15 mm to 50 mm (vary as needed in combination with holes, ribs)

It is contemplated that the present energy absorber 23 can be made to mate with a linear reinforcement beam, or can be made to mate with a longitudinally swept reinforcement beam (21) (see FIGS. 6 and 14). In the case of a swept beam, the lobes of the energy absorber can be oriented to face parallel a direction of expected impact, and/or oriented to face directly forwardly, and/or oriented at slight angles to forwardly depending on their relation to a corner of a vehicle, and depending on vehicle design. For example, the lobes 24 could extend perpendicular to the adjacent portion of the front face of the reinforcement beam (in which case, the end lobes would potentially not extend parallel to the center lobes due to a curved sweep of the beam), or the end lobes could be slightly tilted inwardly at an angle (so that all the lobes extend parallel and forwardly from the vehicle parallel a direction of travel of the vehicle even though ends of the reinforcement beam are curved rearwardly). Also, it is noted that the beam can be made of different materials and formed by different processes, such a beam that is roll formed of steel, or extruded of aluminum, or molded of reinforced polymer.

The illustrated energy absorber is injection molded of polymeric material adapted for absorbing energy, which materials are well known and commercially available. The illustrated energy absorber has enough longitudinal flexibility at its straps 25 to flexibly wrap around and engage a face of a reinforcement beam, even when the ends of the beam had a considerable sweep or an increasing sweep (i.e. increasing rearward curvature near ends). However, it is contemplated that a scope of the present innovation includes energy absorbers made of steel or other metal, and that the energy absorber can be longitudinally non-flexible and made to nest against a particular beam face's profile).

Figure 18:
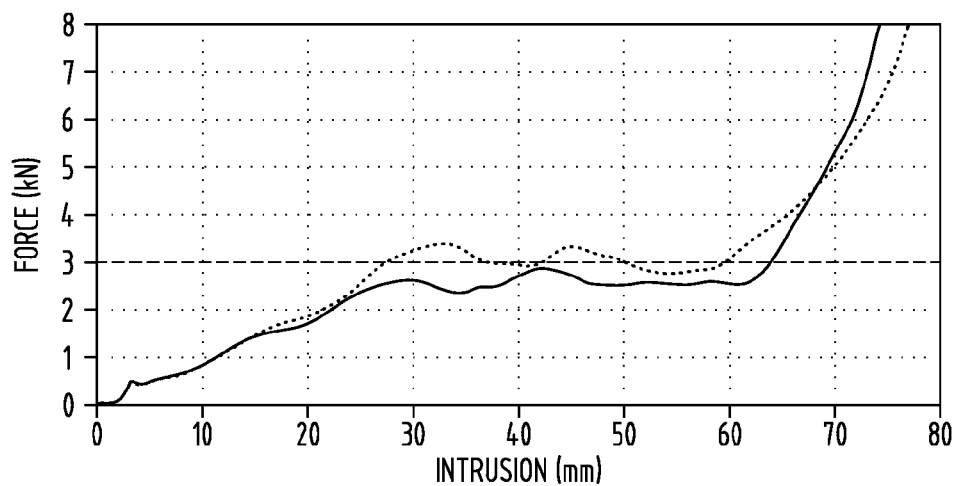
FIGS. 18-20 are graphs showing force versus displacement curves for bumper systems of the present invention having an identical reinforcement beam and a similar energy absorber with identical shaped, spaced lobes, but where the walls of the lobes in FIGS. 18-20 have different thicknesses and/or different apertures at corners to improve consistency of impact strength across their front section and to cause a different max impact-resistive force over an impact stroke of 30 mm to 70 mm, the lobes in each of FIGS. 18-20 being 60 mm deep, and each graph showing two impacts where a greatest difference is expected in force of resistance.
Figure 19:
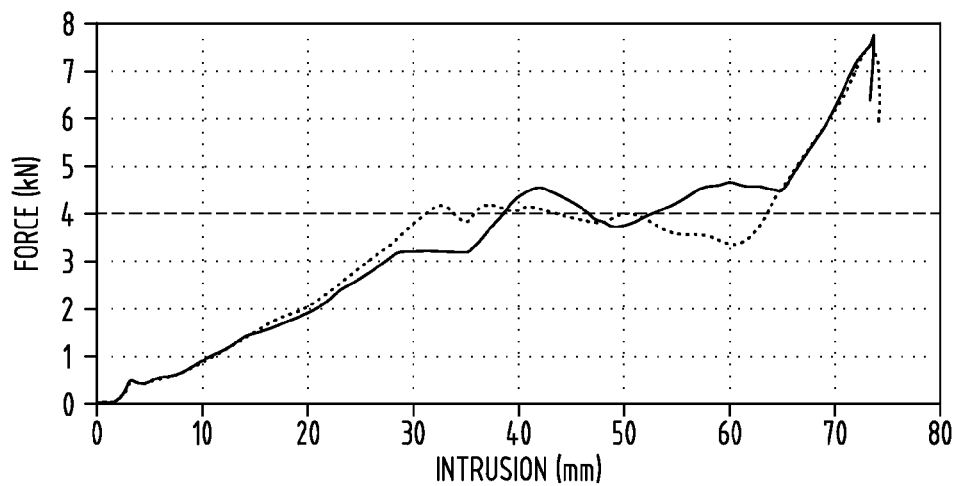
Figure 20:
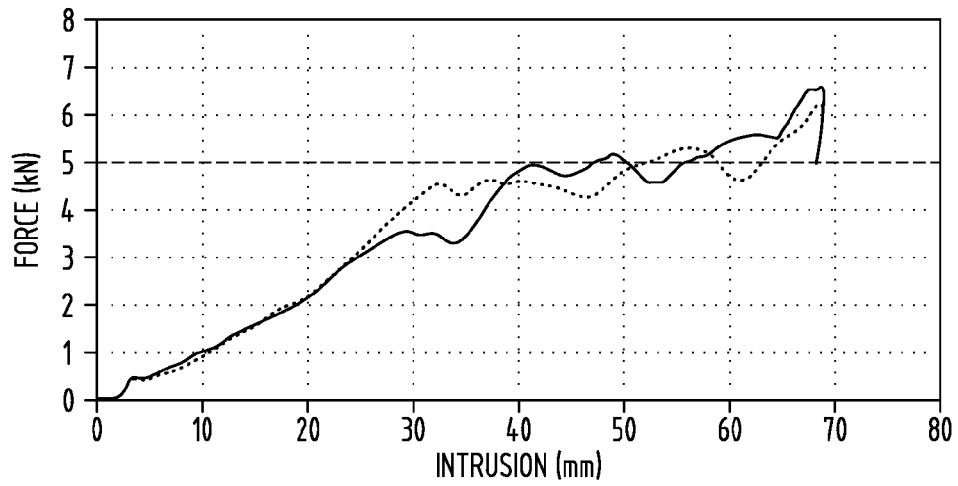

FIGS. 18-20 are graphs showing force versus displacement curves for bumper systems 20 of the present invention having an identical reinforcement beam 21 and an energy absorber very similar to the energy absorber 23. Specifically, the three energy absorbers for FIGS. 18-20 each have identically shaped lobes and lobes spacing (i.e. 110 mm at lobe centerline centers), but the walls 45-49 of the lobes in the energy absorbers of FIGS. 18-20 have slightly different thicknesses and/or different apertures at corners. Specifically, the lobes in each of FIGS. 18-20 were 60 mm deep and each had a centerline spacing of lobes of 110 mm. (i.e. The lobes were about 88 mm-90 mm at a base of the (side-located) vertical shear walls, and the strap widths were about 20 mm-22 mm.) A thickness of the shear walls 45-48 were changed between the energy absorber of FIGS. 18-20 and apertures 60-61 were added at corners of the shear walls 45-48 as needed to optimize uniformity of impact resistive force at all longitudinal locations across the beam impact area of the bumper systems.

The graphs of FIGS. 18-20 each show two impacts, one being at a location on a lobe 24 aligned with a vertical shear wall 47 (or 48) such that a relatively higher impact resistance force is expected, and one being centered over a lobe 24 where a relatively lower impact resistance force is expected. The energy absorbers tested in FIGS. 18-20 were each optimized to provide a consistent impact resistance regardless of where a particular impact location, by adjusting wall thickness and/or placement of apertures 60,61. As illustrated, the force deflection curve for each of the energy absorbers in FIGS. 18-20 are virtually identical up to an impact stroke ("intrusion") of 30 mm. Notably, the energy absorbers of FIGS. 18-20 also included walls adjusted for optimal wall thickness, in order to cause a different level of impact resistance force in the range between 30 mm intrusion to 65 mm. For example, in FIG. 18, the desired force of resistance between 30 mm-65 mm intrusion is 3 kN. Contrastingly, in FIG. 19, the desired force of resistance between 30 mm-65 mm intrusion is 4 kN, and in FIG. 20, the desired force of resistance between 30 mm-65 mm intrusion is 5 kN.

Figure 21:
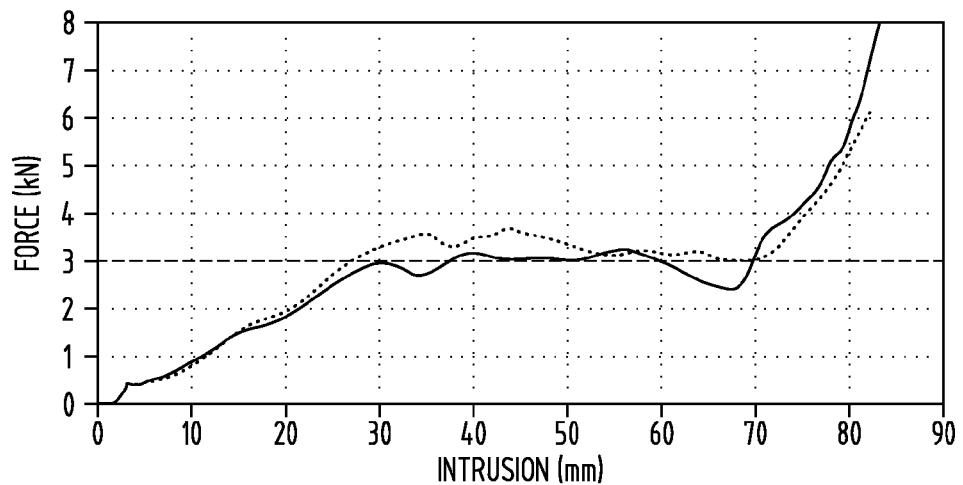
FIGS. 21-23 and 24-26 are graphs similar to FIGS. 18-20, but in FIGS. 21-23 the depth of lobes is 70 mm, and in FIGS. 24-26 the depth of lobes is 80 mm.
Figure 22:
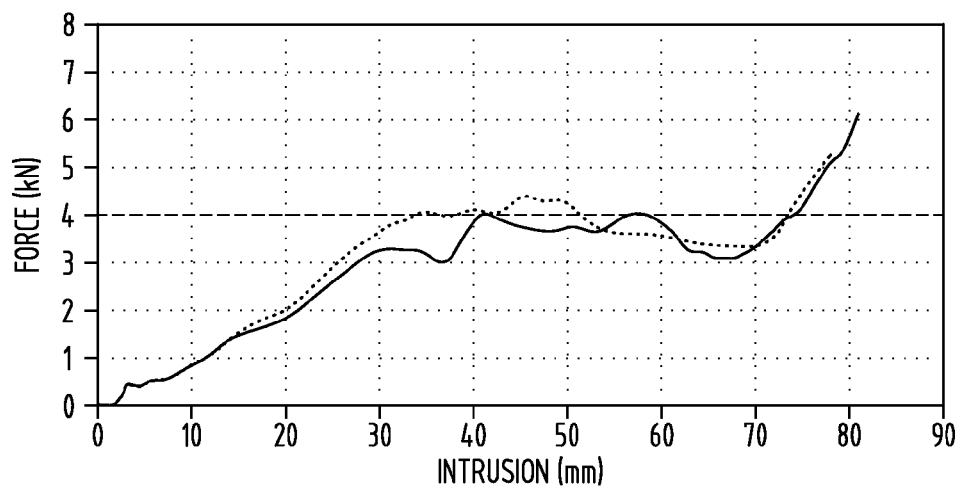
Figure 23:
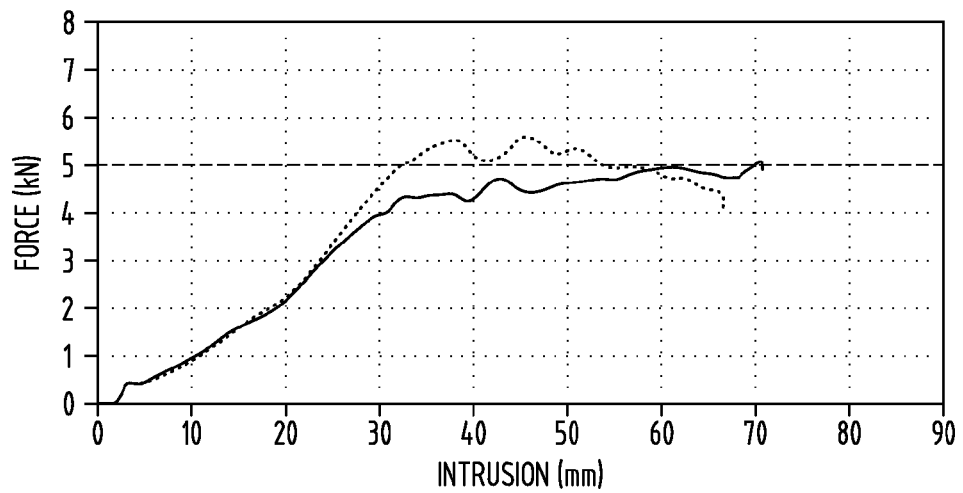
Figure 24:
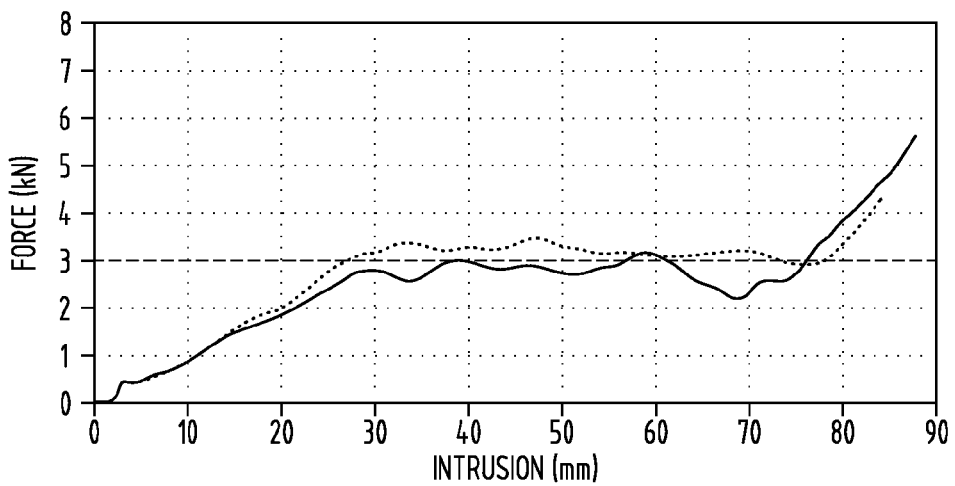
Figure 25:
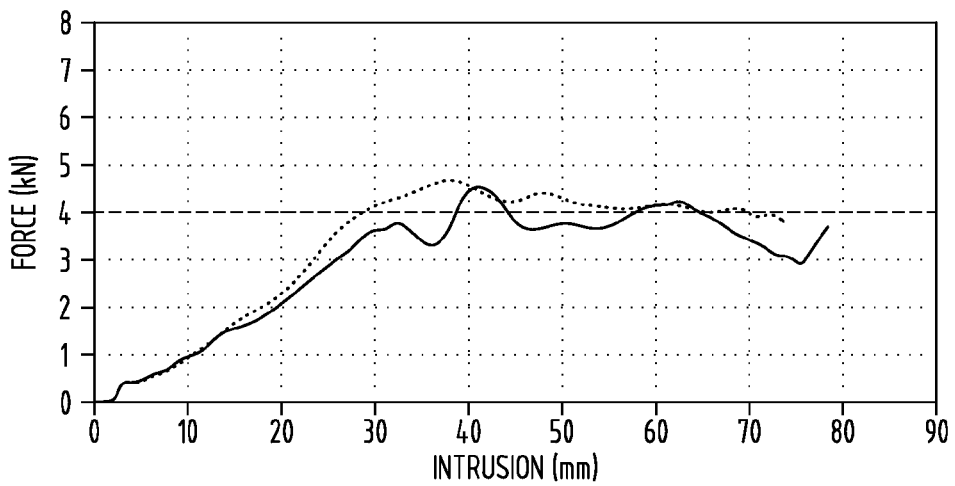
Figure 26:
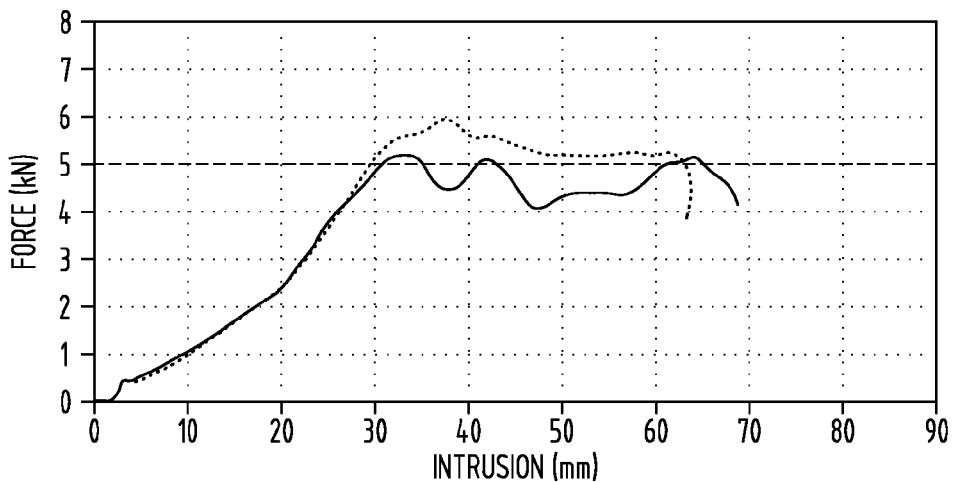

A similar test to that shown in FIGS. 18-20 was performed on bumper systems with an energy absorber having a deeper lobe (24). The results are shown in FIGS. 21-23 for an energy absorber having a 70 mm depth lobe. FIGS. 24-26 show the results of a similar test but using an energy absorber having an 80 mm depth lobe. The results are believed to be self-explanatory, given the discussion above. In each case, the impact resistance force was maintained relatively close to the desired level of impact force resistance, such as to within about +/−20% at 30 mm intrusion. It is noted that consistency of impact resistance can be further improved by tuning the energy absorbers using different "customized" apertures 60,61 as well as exterior ribs 62, as noted below.

In the following modified bumper systems and energy absorbers, identical and similar components, features, and characteristics are identified using the same numbers. Where there is a significant change, the same identification number is used, but a letter is added, such as "A," "B," "C," and etc. This is done to reduce redundant discussion.

Figure 27:
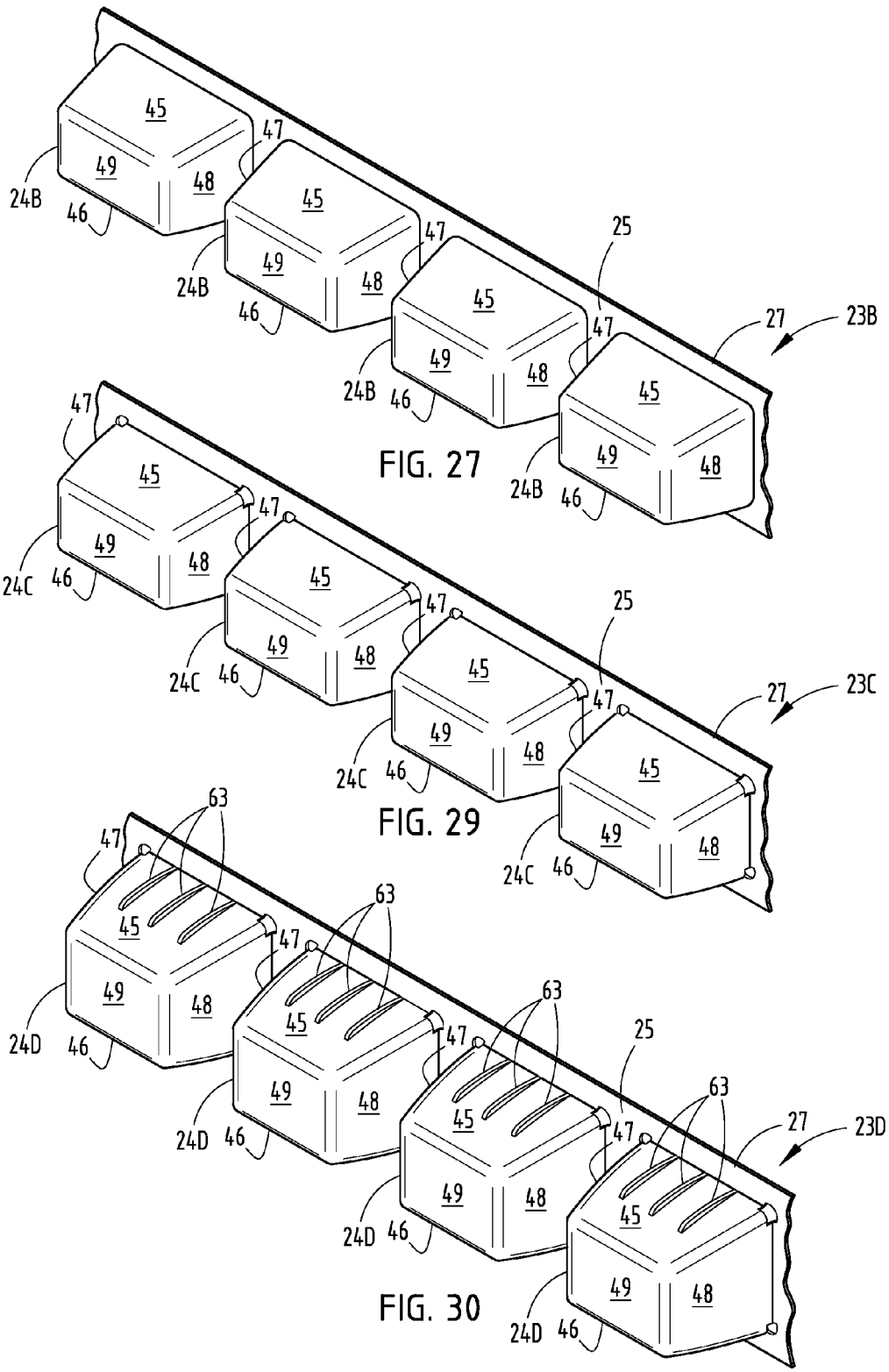
FIG. 27 is a perspective view of a section of a modified energy absorber with holes and FIG. 28 is a force versus displacement curve for a bumper system including the energy absorber of FIG. 27.
Figure 31:
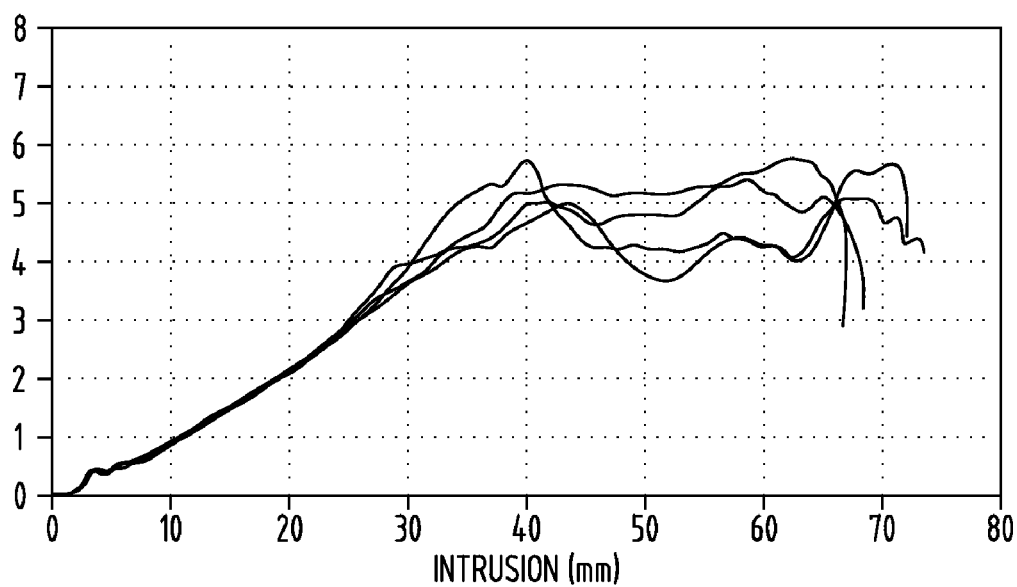
FIG. 31 is a force versus displacement curve for a bumper system including the energy absorber of FIG. 27.
Figure 32:
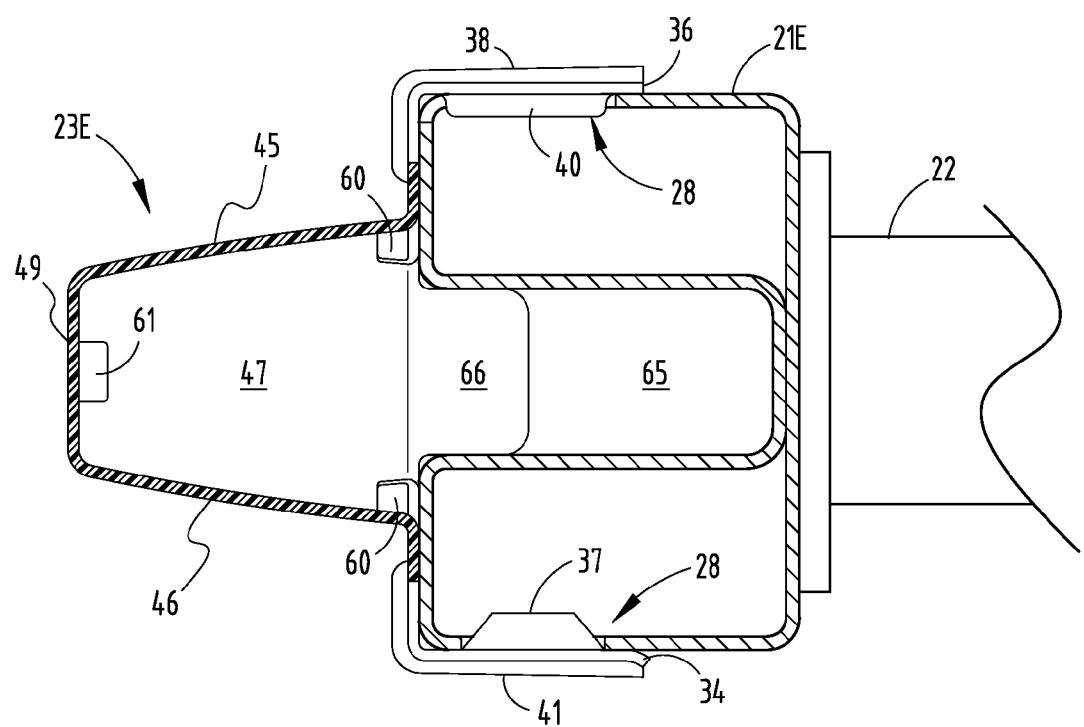
FIG. 32 is a cross-sectional view similar to FIG. 13 but including a modified energy absorber.

The energy absorbers shown in FIG. 27 (and test result shown in FIG. 28) and FIG. 29 and FIG. 30 (and test result shown in FIG. 31) and FIG. 32 provide a further understanding of a scope of the present invention. FIG. 27 (and the test result shown in the graph of FIG. 28) shows that the present concept can embodied in an energy absorber 23B without resorting to apertures and external ribs. FIG. 29 shows an energy absorber 23C including only base apertures 60 (and not apertures 61 at an outer corner on the face of the lobes). FIG. 30 shows that the present concept can be extended by tuning an energy absorber 23D using apertures 60,61 as well as also using external ribs 62 (and FIG. 31 shows a graph of data from same). In FIG. 30, the external ribs 62 form T-shaped cross sections with adjacent portions of the associated (top or bottom) walls.

FIG. 32 shows that the present concept can be used on different beams and different support structures. For example, the bumper reinforcement beam 21E in FIG. 31 is the same as that shown in FIG. 13 but is used in a reversed orientation such that a center channel 65 on the beam 21E faces forwardly (away from a vehicle) as opposed to facing toward the vehicle. The energy absorber 23E includes locater tabs 66 that extend into the channel 65 in the beam 21E, such that the tabs 66 help to retain the energy absorber 23E on a face of the beam 21E during an impact.

Figure 28:
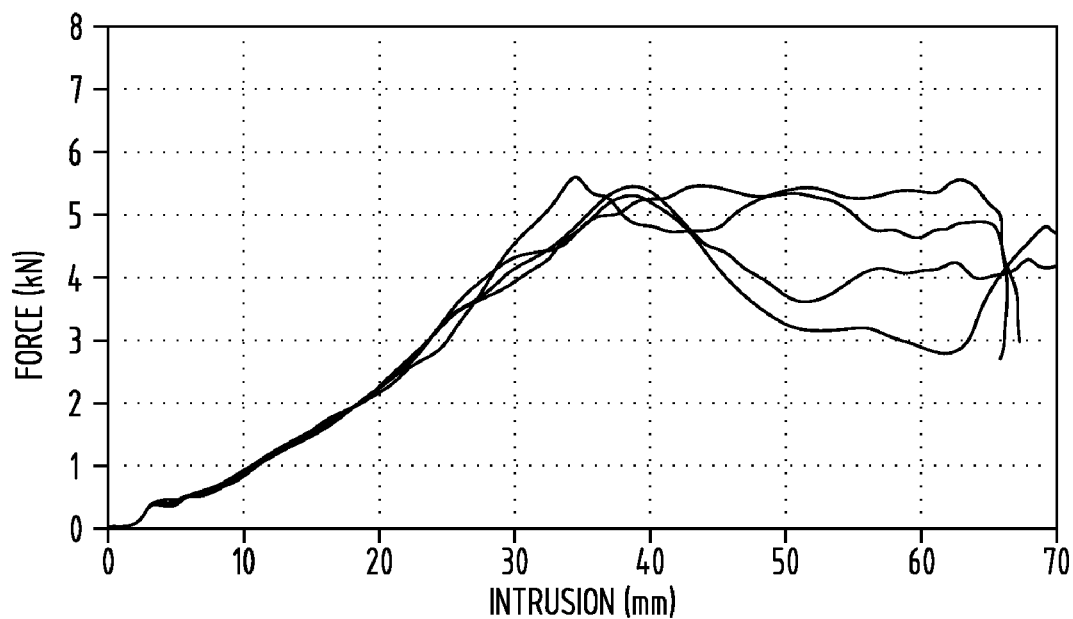

Specifically, FIG. 27 illustrates a modified energy absorber 23B with lobe dimensions the same as those of energy absorber 23 in FIG. 4, but characteristically the energy absorber 23B does not have any corner apertures 60,61 for weakening corners, nor external ribs 62 for stiffening the top and bottom shear walls 45,46. The lobes 24B have a depth of 50 mm, and a longitudinal spacing of 100 mm. FIG. 28 is a force versus displacement curve for a bumper system including the energy absorber 23B of FIG. 27. Notably, the energy absorption is very consistent regardless of a location of impact, as shown by the four impacts charted: one impact being between adjacent lobes, one impact being on the edge of a lobe, one impact being at a mid-center of a lobe, and another impact being on a center of a lobe. Specifically, the impact resistive force is very similar (within about +/−5% of an average number) up to a 30 mm intrusion, and further is similar (within about +1-10%) up to a 45 mm intrusion.

FIG. 29 shows an energy absorber 23C identical to that in FIG. 27, but including base apertures 60. The illustrated energy absorber 23C does not include apertures 61 at an outer corner on the face of the lobes 24C.

FIG. 30 illustrates a modified energy absorber 23D with dimensions as shown, but characteristically does have both corner apertures 60 for weakening the corners and external ribs 62 for stiffening the top and bottom walls 45, 46. The illustrated lobes 24D have a depth of 65 mm, and a longitudinal spacing of 100 mm. FIG. 31 is a force versus displacement curve for a bumper system including the energy absorber 23D of FIG. 30. Notably, the energy absorption is very consistent regardless of a location of impact, as shown by the four impacts charted: one impact being between adjacent lobes, one impact being on the edge of a lobe, one impact being at a mid-center of a lobe, and another impact being on a center of a lobe. Specifically, the impact resistive force is very similar (within about +/−5% of an average number) up to a 30 mm intrusion, and further is similar (within about +/−10%) up to a 45 mm intrusion.

FIG. 31 shows a bumper system including a beam 21E and energy absorber 23E similar to those shown in FIG. 13. However, the beam 21E in FIG. 31, though the same as the beam 21 shown in FIG. 13, is used in a reversed orientation such that a center channel 65 on the beam 21E faces forwardly (away from a vehicle). (In FIG. 13, the channel faced inwardly toward the vehicle.) The energy absorber 23E in FIG. 31 includes locater tabs 66 that extend into the channel 65 in the beam 21E to retain the energy absorber 23E on a face of the beam 21E during an impact.

The illustrated energy absorbers are injection molded from polymer, but it is specifically contemplated that energy absorbers can be made of other materials (such as deformable steel, other metal and non-metal materials), and made by other methods of manufacture (such as thermoforming, compression molding, stamping) and still be within a scope of the present invention. It is contemplated that the present innovation can be used in locations on a vehicle other than just on vehicle bumpers, inside and/or outside the vehicle, such as for door side impact, A-pillar impact, and under-the-dash impacts, and still be within a scope of the present invention.

It is to be understood that variations and modification can be made on the aforementioned structure without departing from the concepts of the present invention, and further it is to be understood that such concepts are intended to be covered by the following claims unless these claims by their language expressly state otherwise.

The embodiments of the invention in which an exclusive property of privilege is claimed are defined as follows:

1. A bumper system for a vehicle having a longitudinal direction and adapted to receive an impact from a standardized test fixture impactor for simulating an impact against a pedestrian's leg where the impactor has an outer diameter of about 132 mm and includes a bone-simulating first part and flesh-simulating and skin-simulating additional parts, the bumper system having corners defined by vertical planes oriented at 60° to the longitudinal direction and engaging a front of the bumper system, the bumper system further having a center region of 250 mm width and a "bumper test area" defined about 66 mm inboard of each of the corners to an adjacent edge of the center region but excluding the center region, comprising:
 a bumper reinforcement beam for attachment to a vehicle frame; and
 an energy absorber positioned on a face of the beam, the energy absorber including a plurality of spaced-apart hollow crush lobes in the bumper test area that crush and absorb energy during a pedestrian impact, the lobes defining lobe centerlines, the spacing between lobe centerlines being between 90 mm to 132 mm and straps of between 15 mm and 50 mm in width, such that the lobes provide a uniform impact energy absorption during crush of within +/−30% of a desired average impact energy absorption force-deflection profile for impact intrusions that crush the crush lobes at least 10 mm in longitudinal locations along a length of the "bumper test area," whereby the bumper system provides for pedestrian safety regardless of a specific location where a pedestrian's leg strikes the energy absorber.

2. The bumper system defined in claim 1, wherein the lobes include shear walls that crush and absorb a predictable amount of energy when impacted.

3. The bumper system defined in claim 2, wherein the shear walls include a pair of opposing vertical shear walls.

4. The bumper system defined in claim 2, wherein the shear walls include a pair of opposing horizontal shear walls.

5. The bumper system defined in claim 2, wherein a force of resistance provided by the shear walls remains relatively constant, within +/−30%, during a working portion of the impact stroke, the working portion being when the shear walls of the lobes are crushing and folding in a manner absorbing energy.

6. The bumper system defined in claim 5, wherein a force of resistance provided by the shear walls remains constant, within +/−20%, during the working portion of the impact stroke.

7. The bumper system defined in claim 1, wherein a force of resistance provided by the lobes during the pedestrian impact is relatively constant during an impact stroke in the range of 30 mm to 60 mm intrusion.

8. The bumper system defined in claim 1, wherein the energy absorber is made of a polymeric material.

9. The bumper system defined in claim 1, wherein the energy absorber is injection molded.

10. The bumper system defined in claim 1, wherein the lobe spacing between the lobe centerlines is between 100 mm and 120 mm.

11. The bumper system defined in claim 1, wherein each of the lobes includes a lobe depth of 50 to 80 mm.

12. The bumper system defined in claim 1, wherein the lobes, when in a vehicle-mounted position, have a lobe height of 50 mm to 90 mm.

13. The bumper system defined in claim 1, wherein the lobes, when in a vehicle-mounted position, includes a depth of between about 50 mm to 90 mm.

14. The bumper system defined in claim 1, wherein the lobes, when in a vehicle-mounted position, include vertical shear walls having a crown of at least 200 mm radius curvature.

15. The bumper system defined in claim 1, wherein the lobes, when in a vehicle-mounted position, include horizontal shear walls having a crown of at least 200 mm radius curvature.

16. The bumper system defined in claim 1, wherein the lobes includes walls having a thickness of 1.5 mm to 2.8 mm.

17. The bumper system defined in claim 1, wherein the lobes include walls having ribs extending along at least one of the walls.

18. The bumper system defined in claim 1, wherein the lobes include radii of about 2 mm-10 mm along corners and at joints of the walls.

19. An energy absorber adapted to be positioned on a face of a structural member for absorbing energy during an impact against the structural member, the energy absorber being adapted to receive an impact from a standardized test fixture impactor for simulating an impact against a pedestrian's leg where the impactor has an outer diameter of about 132 mm and includes a bone-simulating first part and flesh-simulating and skin-simulating additional parts, the energy absorber comprising:

a base flange shaped to engage a reinforcement beam and including a plurality of spaced-apart hollow lobes extending from a base flange, the energy absorber defining a test area including at least three adjacent hollow lobes but excluding end sections of the energy absorber and excluding a center region of about 250 mm, the lobes each having shear walls that crush and absorb energy when impacted, the base flange including straps interconnecting adjacent lobes, the lobes and straps in the test area providing a uniform impact energy absorption during crush of within +/−30% of a desired average impact energy absorption force-deflection profile for impact intrusions of at least 30 mm in longitudinal locations along a length of the "test area" for pedestrian safety regardless of the specific location where an impactor strikes the energy absorber, the lobes having centerlines spaced longitudinally between 90 mm to 132 mm apart and having straps between adjacent ones of the lobes that are 15 mm to 50 mm in width.

20. The energy absorber defined in claim 19, wherein the lobes each include opposing vertical shear walls.

21. The energy absorber defined in claim 20, wherein the lobes each include opposing horizontal shear walls.

22. The energy absorber defined in claim 19, wherein the energy absorber is made of a polymeric material.

23. The energy absorber defined in claim 19, wherein the energy absorber is made of a metal material.

24. An energy absorber shaped to be positioned on a face of a structural member for absorbing energy during an impact against the structural member, the energy absorber being adapted to receive an impact from a standardized test fixture impactor for simulating an impact against a pedestrian's leg where the impactor has an outer diameter of about 132 mm and includes a bone-simulating first part and flesh-simulating and skin-simulating additional parts, the energy absorber comprising:

a base flange shaped to engage a reinforcement beam and including a plurality of spaced-apart hollow lobes extending from a base flange, the energy absorber defining a test area including at least three adjacent hollow lobes but excluding end sections of the energy absorber and excluding a center region of about 250 mm, the lobes each having shear walls that crush and absorb energy when impacted, the base flange including straps interconnecting adjacent lobes, the lobes and straps in the test area providing a uniform impact energy absorption during crush of within +/−30% of a desired average impact energy absorption force-deflection profile for impact intrusions of at least 10 mm in longitudinal locations along a length of the "test area" for pedestrian safety regardless of the specific location where an impactor strikes the energy absorber, the lobes having centerlines spaced longitudinally between 100 mm to 120 mm apart and the straps are 15 mm to 50 mm in width.

25. An energy absorber shaped to be positioned on a face of a beam, the energy absorber being adapted to receive an impact from a standardized test fixture impactor for simulating an impact against a pedestrian's leg where the impactor has an outer diameter of about 132 mm and includes a bone-simulating first part and flesh-simulating and skin-simulating additional parts, the energy absorber comprising:

a base flange;
at least two hollow lobes extending from the base flange and each having top and bottom shear walls and vertical shear walls that join to define four corners, and having at least one aperture strategically located at a base of each corner, the at least one aperture extending partially around each respective corner and into the associated adjacent walls to reduce columnar strength of the respective corner, adjacent ones of the lobes having centerlines spaced apart from 90 mm to 132 mm apart and being interconnected by straps that are 15 mm to 50 mm in width such that adjacent vertical shear walls of the adjacent lobes are spaced apart 15 mm to 50 mm and such that the adjacent lobes characteristically do not engage other lobes, whereby the shear walls and apertures provide a predictable and uniform impact resistance to the impactor simulating impact against a pedestrian's leg regardless of a specific location where the pedestrian's leg strikes the energy absorber, the impact resistance being uniform to within +/−30% of a desired force deflection profile during impacts crushing more than 30 mm the at least one hollow lobe to absorb energy.

26. The energy absorber defined in claim 25, wherein the impact resistance is relatively constant to within +/−30% of a constant force of resistance during impact intrusions of 30 mm to 60 mm as the at least one hollow lobe crushes during the impact.

27. The energy absorber defined in claim 25, wherein the at least two lobes each are a same size and shape.

28. The energy absorber defined in claim 25, wherein the at least two lobes each have an external rib positioned on top and bottom walls in locations spaced inward from sides of the at least two lobes.

29. The energy absorber defined in claim 25, wherein the at least two lobes are made of polymeric material.

30. The energy absorber defined in claim 25, wherein the at least two lobes are made of metal material.

31. An energy absorbing system for a vehicle for providing uniform resistance to an impact by a standard leg impactor, where the standard leg impactor has an outer diameter of 131 mm and simulates a pedestrian's leg including bone, flesh, and skin during a test impact, comprising:

a structural member for attachment to a vehicle; and
an energy absorber positioned on a face of the structural member, the energy absorber having at least four hollow crush lobes interconnected by straps and defining a test area and when impacted defining a working portion of a force-deflection curve where the crush lobes collapse to absorb energy, the working portion being defined as an impact distance between at least 30 mm and 60 mm of intrusion during a test impact, the crush lobes being longitudinally spaced apart from each other by the straps a distance of 15 mm to 50 mm and the lobes having centerlines spaced apart 90 mm to 132 mm and further each lobe having sidewalls defining a depth of 50 mm to 80 mm, the crush lobes providing a uniform impact energy absorption within the working portion of the force-deflection curve within +/−30% of a desired average impact energy absorption force-deflection profile in locations along a length of the test area.

32. The energy absorbing system defined in claim 31, wherein the crush lobes are configured to provide a uniform impact energy absorption within 30% of a desired average impact energy absorption value at a 30 mm to 60 mm impact intrusion in all longitudinal locations along a length of the at least four hollow crush lobes.

33. The energy absorbing system defined in claim 31, wherein the structural member includes a bumper reinforcement beam.

34. The bumper system defined in claim 31, wherein the energy absorber is made of a polymeric material.

35. A method comprising steps of:

providing a support structure;

providing a standardized test fixture impactor for simulating an impact against a pedestrian's leg where the impactor has an outer diameter of about 132 mm and includes a bone-simulating first part and flesh-simulating and skin-simulating additional parts;

providing an energy absorber with a base flange engaging the support structure and including spaced-apart hollow lobes extending from the base flange and not engaging other crush lobes and together defining a test area; the lobes each including shear walls that crush and absorb energy along a force deflection profile when impacted by the impactor for an intrusion stroke causing collapse of the hollow lobes of at least 10 mm, the lobes defining centerlines that are located a distance apart of between 90 mm to 132 mm, and the lobes being spaced apart by straps that are 15 mm to 50 mm wide; and impacting the energy absorber against the support structure using the impactor and then providing a modified energy absorber with the crush lobes of the energy absorber modified to improve uniformity of energy absorption to within +1-30% of a desired average energy absorption profile regardless of a specific location of impact by the impactor along the test area of the energy absorber, the crush lobes being modified by forming at least one of apertures and external ribs on the crush lobes, where the ribs are located on shear walls of the crush lobes and where the apertures are located at corners formed by adjacent ones of the shear walls, to thus provide uniform performance and pedestrian safety regardless of a specific location where a pedestrian's leg strikes the energy absorber.

36. The energy absorber defined in claim 19, wherein the uniform impact energy absorption extends to at least 50 mm impact intrusion.

37. The energy absorber defined in claim 25, wherein the uniform impact energy absorption extends to at least 50 mm impact intrusion.

38. The method defined in claim 31, wherein the uniform impact energy absorption extends to at least 50 mm impact intrusion.

* * * * *

UNITED STATES PATENT AND TRADEMARK OFFICE
CERTIFICATE OF CORRECTION

| | |
|---|---|
| PATENT NO. | : 8,196,979 B2 |
| APPLICATION NO. | : 12/940680 |
| DATED | : June 12, 2012 |
| INVENTOR(S) | : Daniel Ralston et al. |

It is certified that error appears in the above-identified patent and that said Letters Patent is hereby corrected as shown below:

Col. 7, line 3;

"1.75 mm-20 mm" should be --1.75 mm-2.0 mm--.

Col. 9, line 61;

"13" should be --15--

Col. 16, claim 31, lines 37-38;

"131 mm" should be --132 mm--

Signed and Sealed this
Thirty-first Day of July, 2012

David J. Kappos
*Director of the United States Patent and Trademark Office*